(12) United States Patent
Takayama et al.

(10) Patent No.: US 10,325,254 B2
(45) Date of Patent: *Jun. 18, 2019

(54) COMMUNICATION TERMINAL AND COMMUNICATION METHOD USING PLURAL WIRELESS COMMUNICATION SCHEMES

(71) Applicant: Sovereign Peak Ventures, LLC, Plano, TX (US)

(72) Inventors: Hisashi Takayama, Tokyo (JP); Tetsuo Matsuse, Kanagawa (JP); Kyoko Kawaguchi, Tokyo (JP); Yoshiaki Nakanishi, Tokyo (JP); Osamu Sasaki, Kanagawa (JP)

(73) Assignee: Sovereign Peak Ventures, LLC, Plano, TX (US)

( * ) Notice: Subject to any disclaimer, the term of this patent is extended or adjusted under 35 U.S.C. 154(b) by 150 days.

This patent is subject to a terminal disclaimer.

(21) Appl. No.: 15/180,293

(22) Filed: Jun. 13, 2016

(65) Prior Publication Data

US 2017/0024727 A1 Jan. 26, 2017

Related U.S. Application Data

(63) Continuation of application No. 09/831,830, filed as application No. PCT/JP00/06355 on Sep. 18, 2000, now Pat. No. 9,396,469.

(30) Foreign Application Priority Data

Sep. 16, 1999 (JP) .................................. 11262766

(51) Int. Cl.
*G06Q 40/00* (2012.01)
*H04M 1/00* (2006.01)
(Continued)

(52) U.S. Cl.
CPC .......... *G06Q 20/367* (2013.01); *G06Q 20/04* (2013.01); *G06Q 20/06* (2013.01); *G06Q 20/065* (2013.01);
(Continued)

(58) Field of Classification Search
USPC ...................... 705/41, 5, 6; 455/414.3, 550.1
See application file for complete search history.

(56) References Cited

U.S. PATENT DOCUMENTS 4,825,052 A 4/1989 Chemin et al.
4,910,774 A 3/1990 Barakat
(Continued)

FOREIGN PATENT DOCUMENTS

EP 0316689 5/1989
EP 0917120 5/1999
(Continued)

OTHER PUBLICATIONS

Office Action for JP 2001524017 with partial English translation dated Dec. 8, 2009.
(Continued)

*Primary Examiner* — Hani M Kazimi
(74) *Attorney, Agent, or Firm* — Ascenda Law Group, PC

(57) ABSTRACT

The present invention provides an electronic wallet having a higher level of anonymity, security and convenience, which is capable of efficient electronizing of value information as well as which allows the user to efficiently manage the electronic value information. A presentation card indicating the fixed property of an electronic value is digitally signed by the service provider; a variable property is digitally signed with the private key of that electronic value. A service control, security information, representation control and representation resource are digitally signed by the
(Continued)

service provider. These digital signature will be authenticated each time an electronic value object is generated.

14 Claims, 32 Drawing Sheets

(51) Int. Cl.
G06Q 20/36 (2012.01)
G06Q 20/04 (2012.01)
G06Q 20/06 (2012.01)
G06Q 20/22 (2012.01)
G06Q 20/32 (2012.01)
G06Q 20/34 (2012.01)
G06Q 20/38 (2012.01)
G06Q 20/40 (2012.01)

(52) U.S. Cl.
CPC ............ G06Q 20/29 (2013.01); G06Q 20/32 (2013.01); G06Q 20/325 (2013.01); G06Q 20/3226 (2013.01); G06Q 20/3278 (2013.01); G06Q 20/3415 (2013.01); G06Q 20/3825 (2013.01); G06Q 20/3829 (2013.01); G06Q 20/40 (2013.01)

(56) References Cited

U.S. PATENT DOCUMENTS

| | | | |
|---|---|---|---|
| 5,396,558 A | 3/1995 | Ishiguro et al. | |
| 5,440,634 A | 8/1995 | Jones et al. | |
| 5,508,731 A | 4/1996 | Kohom | |
| 5,655,219 A | 8/1997 | Jusa et al. | |
| 5,731,576 A | 3/1998 | Valadier | |
| 5,748,737 A | 5/1998 | Daggar | |
| 5,796,827 A | 8/1998 | Coppersmith et al. | |
| 6,016,484 A | 1/2000 | Williams | |
| 6,026,388 A | 2/2000 | Liddy et al. | |
| 6,058,312 A | 5/2000 | Kimura | |
| 6,091,956 A | 7/2000 | Hollenberg | |
| 6,332,133 B1 | 12/2001 | Takayama | |
| 6,345,263 B1 | 2/2002 | Matsumoto et al. | |
| 6,394,341 B1 | 5/2002 | Makipaa et al. | |
| 6,873,974 B1 | 3/2005 | Schutzer | |
| 6,901,425 B1 | 5/2005 | Dykes et al. | |
| 7,392,226 B1 | 6/2008 | Sasaki | |
| 7,523,067 B1 | 4/2009 | Nakajima | |
| 7,590,602 B1 | 9/2009 | Luzzatto | |
| 2001/0011250 A1 | 8/2001 | Paltenghe | |
| 2001/0055978 A1 | 12/2001 | Herrod et al. | |
| 2002/0194121 A1 | 12/2002 | Takayama | |
| 2003/0181201 A1 | 9/2003 | Bomze et al. | |
| 2009/0125429 A1 | 5/2009 | Takayama | |

FOREIGN PATENT DOCUMENTS

| | | |
|---|---|---|
| EP | 1024626 | 8/2000 |
| FR | 2710769 | 4/1995 |
| GB | 2261538 | 5/1993 |
| JP | 11031204 | 1/1999 |
| JP | 11225143 | 8/1999 |
| JP | 2000224156 | 8/2000 |
| WO | WO 9837663 | 8/1998 |
| WO | WO 9909502 | 2/1999 |

OTHER PUBLICATIONS

Peter Fingar et al., "The Business of Distributed Object Computing", Object Magazine, Apr. 1997.

Steve Glassman et al., "The Millicent Protocol for Inexpensive Electronic Commerce", World Wide Web Journal—Fourth International World Wide Web Conference, Dec. 1995.

Peter Wayner, Digital Cash: Commerce on the Net, $2^{nd}$ Edition, Apr. 1997, p. 212-213, Academic Press, London.

International Search Report for PCT/JP00/06355 dated Dec. 26, 2000.

Fig. 1   PRIOR ART
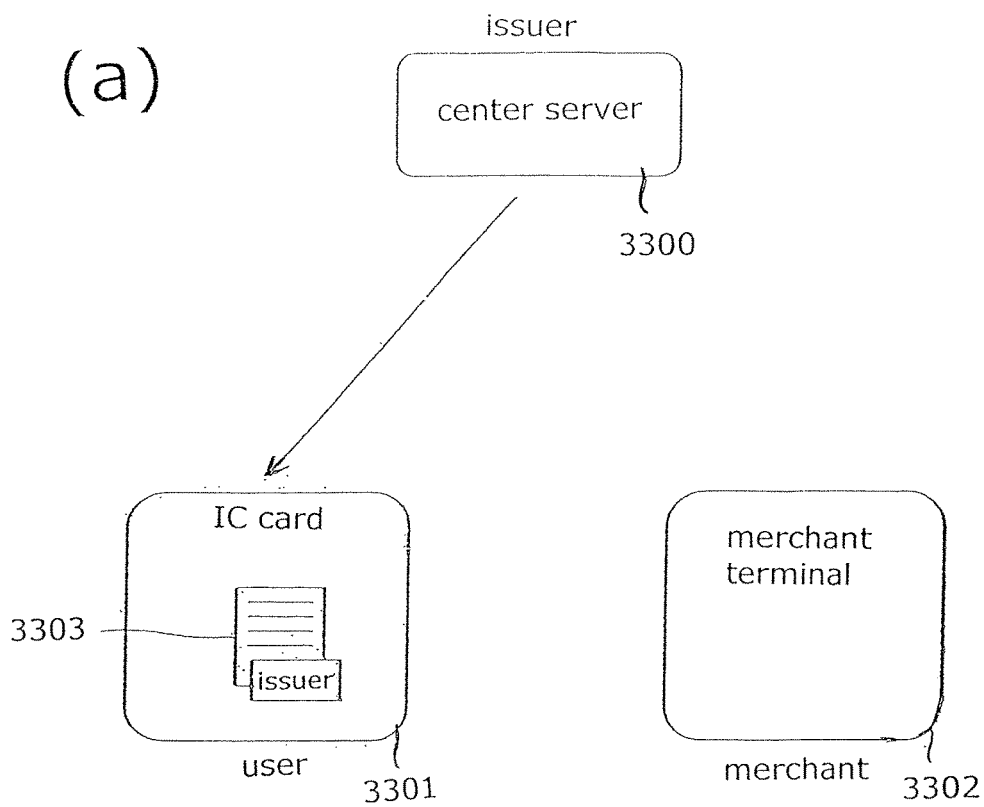
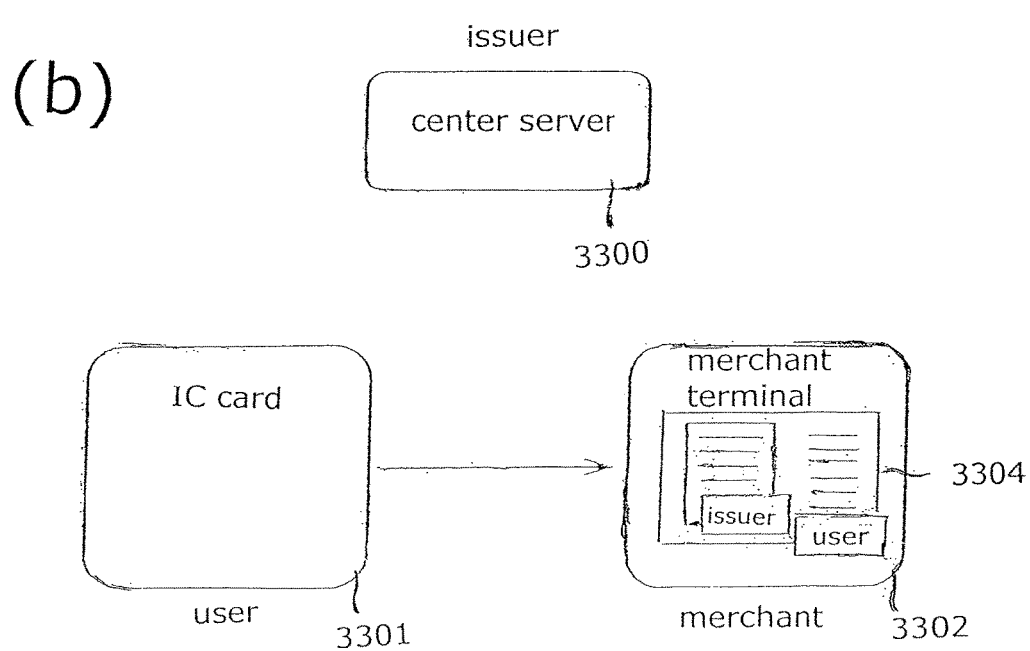

Fig. 7
(a)
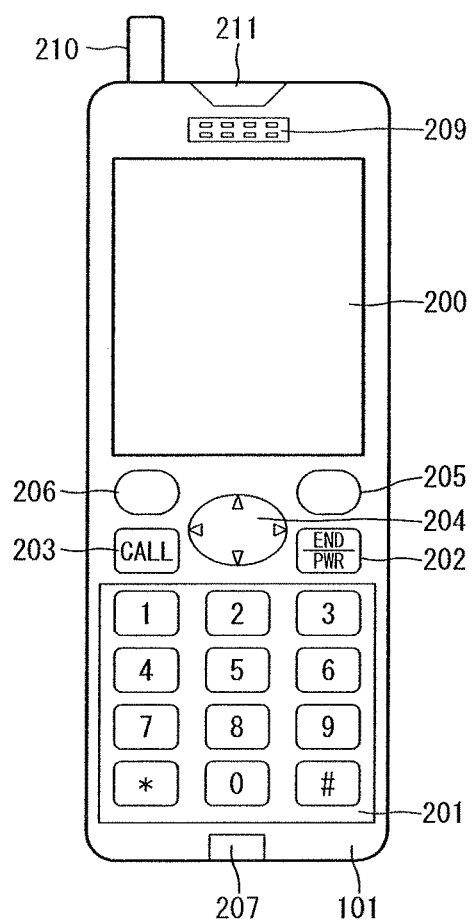
(b)
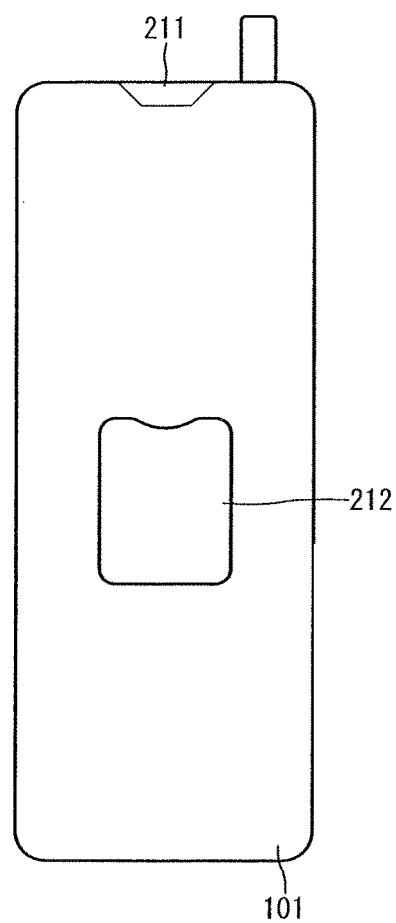

Fig. 17

```
<EVML version="0.1">
    <Description about="wallet:///EValue/ev00000033">
        <SignedDescription about="PresentationCard" evID="10000000000000000000000000000001">
                        :
            <Signer rdf:resource="http://www.evalue.com"/>
            <Signature>0123456789</Signature>
        </SignedDescription>                                                                      ┤─ 801
                                                                                                   presentation
                                                                                                   card <SignedDescription about="VriableProperty" evID="10000000000000000000000000000001">
                        :
            <Signer rdf:resource="http://www.evalue.com/evalue/10000000000000000000000000000001"/>
            <Signature>123456789A</Signature>                                                     ┤─ 802
        </SignedDescription>                                                                       variable
                                                                                                   property <SignedDescription>
            <Description about="ServiceCtrl" evID="10000000000000000000000000000001">
                        :                                                                         ┤─ 803
            </Description>                                                                         service
                                                                                                   control <Description about="SecurityInf" evID="10000000000000000000000000000001">
                        :                                                                         ┤─ 804
            </Description>                                                                         security
                                                                                                   information <Description about="RepresentaionCtrl" evID="10000000000000000000000000000001"
                rdf:resource="http://www.evalue.com/evalue/ev_0000300000000201/RpCtrl"/>          ┤─ 805
                                                                                                   presentation
                                                                                                   control <Description about="RepresentaionRes" evID="10000000000000000000000000000001"
                rdf:resource="http://www.evalue.com/evalue/ev_0000300000000201/RpRes"/>           ┤─ 806
                                                                                                   presentation
                                                                                                   resource
            <SignedTime>1999.09.07T12:15:07+0900</SignedTime>
            <Signer rdf:resource="http://www.evalue.com"/>
            <Signature>23456789AB</Signature>
        </SignedDescription>

<SignedDescription about="http://www.evalue.com/evalue/ev_0000300000000201/RpCtrl"
            evID="10000000000000000000000000000001">
                        :                                                                         ┤─ 1201
            <Signer rdf:resource="http://www.evalue.com"/>                                         presentation
            <Signature>3456789ABC</Signature>                                                      control
        </SignedDescription>                                                                       (entity)

<Description about="http://www.evalue.com/evalue/ev_0000300000000201/RpRes"
            evID="10000000000000000000000000000001">                                              ┤─ 1202
                        :                                                                          presentation
        </Description>                                                                             resource
                                                                                                   (entity)

<Description about="http://www.evalue.com">
            <EntityName>Mobile Ticket Service</EntityName>
            <EntityID>00000000000000000000000000000001</EntityID>                                 ┤─ 1200
            <Email>ev_issuer@evalue.com</Email>                                                    description
            <Telnum>81-3-5460-xxxx</Telnum>                                                        about service
        </Description>                                                                             provider
    </Description>
</EVML>
```

Fig. 18

```xml
<SignedDescription about="PresentationCard" evID="10000000000000000000000000000001">
    <evType>ticket</evType>
    <evCode>0000300000000201</evCode>
    <evID>10000000000000000000000000000001</evID>
    <evName>Soccer 200X Ticket</evName>
    <evConditionBitmap>0000000000000001</evConditionBitmap>
    <evProp name="TITLE" value="Soccer 200X Japan vs Brazil"/>
    <evProp name="DATE" value="2002.06.30T14:00+0900"/>
    <evProp name="GATE_OPEN" value="2002.06.30T10:00+0900"/>
    <evProp name="LOCATION_NAME" value="Yokohama"/>
    <evProp name="LOCATION_URI" value="http://www.yis.co.jp/map"/>
    <evProp name="SEAT_NUM" value="SS-A-28"/>
    <evProp name="SEAT_POS" value="http://www.mts.com/ticket123/seat/SS-A-28"/>
    <evProp name="SPONSOR_NAME" value="WORLD FOOTBALL ASSOCIATION"/>
    <evProp name="SPONSOR_URI" value="http://www.wfa.org"/>
    <evProp name="CONTACT_TELNUM" value="+81-3-5460-xxxx"/>
    <evProp name="CONTACT_URI" value="http://www.mts.com/contact"/>
    <evProp name="ISSUER_NAME" value="Mobile Ticket Service"/>
    <evProp name="ISSUER_URI" value="http://www.mts.com"/>
    <evProp name="MESSAGE_1" value="No Dangerous Objects"/>
    <SignedTime>1999.09.07T12:15:07+0900</SignedTime>
    <Signer rdf:resource="http://www.evalue.com"/>
    <Signature>0123456789</Signature>
</SignedDescription>

<SignedDescription about="VriableProperty" evID="10000000000000000000000000000001">
    <evFlag VALIDITY=1 USED=0/>
    <evProp name="USE_SERIAL" value=0/>
    <evProp name="NUMBER" value=1/>
    <evProp name="START_VALID" value="1999.07.23T00:00+0900"/>
    <evProp name="END_VALID" value="2002.06.30T23:59+0900"/>
    <evProp name="MESSAGE_2" value=/>
    <SignedTime>1999.09.07T12:15:07+0900</SignedTime>
    <Signer rdf:resource="http://www.evalue.com/evalue/10000000000000000000000000000001"/>
    <Signature>123456789A</Signature>
</SignedDescription>
```

Fig. 19

```
<Description about="ServiceCtrl" evID="1000000000000000000000000000001">
    <SC-module type="ticket" ID=1 number=$NUMBER start=$START_VALID end=$END_VALID
        used_flag=$USED validity_flag=$VALIDITY serial=$USE_SERIAL/>
    <SC-module type="verify_prop" ID=2 prop=$SEAT_NUM/>
    <SC-module type="set_message" ID=3 msg=$MESSAGE_2/>
</Description>

<Description about="SecurityInf" evID="1000000000000000000000000000001">
    <evOwner>
        <Description about="http://www.evalue.com/user/11000000000000000000000000000001"
            EntityName="Taro Suzuki"
            EntityID="11000000000000000000000000000001"/>
    </evOwner>
    <evResource>http://www.evalue.com/evalue/1000000000000000000000000000001</evResource>
    <evCertificate>
        0123456789ABCDEF0123456789ABCDEF0123456789ABCDEF0123456789ABCDEF
    </evCertificate>
    <evPrivateKey>0123456789</evPrivateKey>
    <evAuthKey>0123456789ABCDEF</evAuthKey>
    <evhandlerAuthKey>ABCDEF0123456789</evhandlerAuthKey>
</Description>
```

*Fig. 20*

```
<SignedDescription about="http://www.evalue.com/evalue/ev_0000300000000201/RpCtrl"
    evID="10000000000000000000000000000001">
    <OptimumRpCtrl>
        <Description about="http://www.evalue.com/evalue/ev_0000300000000201/RpCtrl_M01">
            < RpType>MOBILE 01</RpType>
            < RepresentaionCtrlData>
                <CARD name="Main">
                    <HAEAD>
                        <TITLE><evP>$TITLE</evP></TITLE>
                    </HAEAD>
                    <BODY>
                    <Do type="ACCEPT">
                        <Go HREF="wallet:///evTransact"/>
                    </Do>
                    <CENTER><H1><evP>$TITLE</evP></H1></CENTER>
                    <BR><CENTER><IMG SRC="wallet:///evResource label=MAIN_IMG"></CENTER>
                    <BR><UL>Date:<evP>$DATE</evP>
                    <BR>Stadium:<A HREF=<evP>$LOCATION_URI</evP>><evP>$LOCATION_NAME</evP></A>
                    <BR>Seat:<A HREF=<evP>$SEAT_POS</evP>><evP>$SEAT_NUM</evP></A>
                    <BR><A HREF="Detail">Details</A></UL>
                    </BODY>
                </CARD>
                <CARD name="Detail">
                    <HAEAD>
                        <TITLE><evP>$TITLE</evP></TITLE>
                    </HAEAD>
                    <BODY>
                    <Do type="ACCEPT">
                        <Go HREF="wallet:///evTransact"/>
                    </Do>
                    <CENTER><H1><evP>$TITLE</evP></H1></CENTER>
                    <BR><UL>Date:<evP>$DATE</evP>
                    <BR>Open Gate:<evP>$GATE_OPEN</evP>
                    <BR>Stadium:<A HREF=<evP>$LOCATION_URI</evP>><evP>$LOCATION_NAME</evP></A>
                        <BR><A HREF="wallet:///evResource label=MAP">Map</A>
                    <BR>Seat:<A HREF=<evP>$SEAT_POS</evP>><evP>$SEAT_NUM</evP></A>
                    <BR>Term of Validity: <evV>$START_VALID</evV> - <evV>$END_VALID</evV>
                    <BR>Sponsor:<A HREF=<evP>$SPONSOR_URI</evP>><evP>$SPONSOR_NAME</evP></A>
                    <BR>Contact:<A HREF="telephone:///dial num=<evP>$CONTACT_TELNUM</evP>">
                        <evP>$CONTACT_TELNUM</evP></A>
                    <BR>Issuer:<A HREF=<evP>$ISSUER_URI</evP>><evP>$ISSUER_NAME</evP></A>
                    <BR><evP>$MESSAGE_1</evP>
                    <BR><evV>$MESSAGE_2</evV>
                    <BR><A HREF="Main">Top Page</A></UL>
                    </BODY>
                </CARD>
            </RpresentaionCtrlData>
        </Description>
    </OptimumRpCtrl>
    <SignedTime>1999.09.07T12:15:07+0900</SignedTime>
    <Signer rdf:resource="http://www.evalue.com"/>
    <Signature>3456789ABC</Signature>
</SignedDescription>
```

*Fig. 21*

```
< Description about="http://www.evalue.com/evalue/ev_0000300000000201/RpRes"
    evID="10000000000000000000000000000001">
    <OptimumRpRes>
        <Image>
            URI="http://www.evalue.com/resources/0123456789ABCDEF"
            label="MAIN_IMG"
            type="jpeg"
            data="1202A846574A63D946 ................... B48364605987F687543"
        </Image>
        <Image>
            URI="http://www.evalue.com/resources/123456789ABCDEF0"
            label="MAP"
            type="jpeg"
            data="202A846574A63D946B ................... 48364605987F687543F"
        </Image>
        <Sound>
            URI="http://www.evalue.com/resources/23456789ABCDEF01"
            label="Greet"
            type="mp3"
            data="1202A846574A63D946 ................... B48364605987F687543"
        </Sound>
    </OptimumRpRes>
</Description>
```

*Fig. 22*

```
<EVML version="0.1">
  <CARD name="Main">
    <HAEAD>
      <TITLE>Soccer 200X Japan vs Brazil </TITLE>
    </HAEAD>
    <BODY>
      <Do type="ACCEPT">
        <Go HREF="wallet:///evTransact"/>
      </Do>
      <CENTER><H1>Soccer 200X Japan vs Brazil </H1></CENTER>
      <BR><CENTER><IMG SRC="wallet:///evResource label=MAIN_IMG"></CENTER>
      <BR><UL>Date: 2002.06.30T14:00+0900
      <BR>Stadium:<A HREF="http://www.yis.co.jp/map"> Yokohama </A>
      <BR>Seat:<A HREF="http://www.mts.com/ticket123/seat/SS-A-28"> SS-A-28</A>
      <BR><A HREF="Detail">Details</A></UL>
    </BODY>
  </CARD>
</EVML>
```

*Fig. 23*

```
<EVML version="0.1">
  <Description about="evMerchant:///evHandler/evh00000001">
    <SignedDescription>
      <Description about="evProperty" evhandlerID="20000000000000000000000000000001">      ┐
        <evType>ticket</evType>                                                              │
        <evCode>0000300000000201</evCode>                                                    │
        <evhandlerID>20000000000000000000000000000001</evhandlerID>                          │
        <evName>Soccer 200X Ticket</evName>                                                  │
        <evConditionBitmap>00000000000001</evConditionBitmap>                                │
        <evProp name="TITLE" value="Soccer 200X Japan vs Brazil"/>                           │
        <evProp name="DATE" value="2002.06.30T14:00+0900"/>                                  │
        <evProp name="GATE_OPEN" value="2002.06.30T10:00+0900"/>                             │
        <evProp name="LOCATION_NAME" value="Yokohama"/>                                      ├── 900
        <evProp name="LOCATION_URI" value="http://www.yis.co.jp/map"/>                       │   value property
        <evProp name="SEAT_NUM" value= permission="public"/>                                 │   descriptor
                  :                                                                          │
        <evProp name="MESSAGE_2" value= permission="public"/>                                │
      </Description>                                                                         ┘
      <Description about="ServiceCtrl" evhandlerID="20000000000000000000000000000001">      ┐
        <SC-module type="ticket" ID=1 number=$NUMBER start=$START_VALID end=$END_VALID      │
            used_flag=$USED validity_flag=$VALIDITY serial=$USE_SERIAL/>                    ├── 903
        <SC-module type="verify_prop" ID=2 prop=$SEAT_NUM/>                                 │   service
        <SC-module type="set_message" ID=3 msg=$MESSAGE_2/>                                 │   control
      </Description>                                                                         ┘
      <Description about="SecurityInf" evhandlerID="20000000000000000000000000000001">      ┐
        <evhandlerOwner>                                                                     │
          <Description about="http://www.evalue.com/merchant/21000000000000000000000000000001"
              EntityName="ABC Event Service"                                                 │
              EntityID="21000000000000000000000000000001"/>                                  │
        </evhandlerOwner>                                                                    ├── 904
        <evResource>http://www.evalue.com/evhandler/20000000000000000000000000000001        │   security
        </evResource>                                                                        │   information
        <evAuthKey>0123456789ABCDEF</evAuthKey>                                              │
        <evhandlerAuthKey>ABCDEF0123456789</evhandlerAuthKey>                                │
      </Description>                                                                         ┘
      <SignedTime>1999.09.07T12:15:07+0900</SignedTime>
      <Signer>
        <Description about="http://www.evalue.com">
          <EntityName>Mobile Ticket Service</EntityName>
          <EntityID>00000000000000000000000000000001</EntityID>
          <Email>ev_issuer@evalue.com</Email>
          <Telnum>81-3-5460-xxxx</Telnum>
        </Description>
      </Signer>
      <Signature>23456789AB</Signature>
    </SignedDescription>
    <Description about="MerchantOption" evhandlerID="20000000000000000000000000000001">    ┐
      <SetevProp>$SEAT_NUM="SS-*-*"</SetevProp>                                              ├── 905
      <SetevProp>$MESSAGE_2="Special News available: http://www.yis.co.jp/news/20020630"    │   merchant
      </SetevProp>                                                                           │   option
    </Description>                                                                           ┘
  </Description>
</EVML>
```

```
<SC-MSG>
    <scm_msg ID=1 number=1 start="1999.07.23T00:00+0900" end="2002.06.30T23:59+0900"
        used_flag=0 validity_flag=1 serial=0/>
    <scm_msg ID=2 prop="SS-A-28"/>
    <scm_msg ID=3 msg=/>
</SC-MSG>
```

(b)

```
<SC-MSG>
    <scm_msg ID=1 number=0 start="2002.06.30T12:25+0900" end="2002.06.30T23:59+0900"
        used_flag=1 validity_flag=1 serial=1/>
    <scm_msg ID=3 msg="Special News available: http://www.yis.co.jp/news/20020630"/>
</SC-MSG>
```

(c)

```
<SC-MSG>
    <scm_msg ID=1 number=0 start="2002.06.30T12:25+0900" end="2002.06.30T23:59+0900"
        used_flag=1 validity_flag=1 serial=1/>
    <scm_msg ID=2 prop="SS-A-28"/>
    <scm_msg ID=3 msg="Special News available: http://www.yis.co.jp/news/20020630"//>
</SC-MSG>
```

(d)

```
<SC-MSG>
    <scm_msg ID=1 serial=1/>
</SC-MSG>
```

*Fig. 25*

```
<SignedDescription about="VriableProperty" evID="10000000000000000000000000000001">
    <evFlag VALIDITY=1 USED=1/>
    <evProp name="USE_SERIAL" value=1/>
    <evProp name="NUMBER" value=0/>
    <evProp name="START_VALID" value="2002.06.30T12:25+0900"/>
    <evProp name="END_VALID" value="2002.06.30T23:59+0900"/>
    <evProp name="MESSAGE_2" value="Special News available: http://www.yis.co.jp/news/20020630"/>
    <SignedTime>2002.06.30T12:25+0900</SignedTime>
    <Signer rdf:resource="http://www.evalue.com/evalue/10000000000000000000000000000001"/>
    <Signature>A12345678A</Signature>
</SignedDescription>
```

*Fig. 26*

```
<EVML version="0.1">
    <CARD name="Receive EV ">
        <HAEAD>
            <TITLE>Receive Electronic Value</TITLE>
        </HAEAD>
        <BODY>
            Your order was accepted.
            <BR>
            <CENTER>
            <H1>
                <Go HREF="wallet:///evReceive">
                    <param name="EV_ISSUER_URI"   value="http://www.evalue.com"/>
                    <param name="SESSION_NUM"   value="a01b23c45d67e89f"/>
                    Receive e-Value
                </Go>
            </H1>
            </CENTER>
        </BODY>
    </CARD>
</EVML>
```

Fig. 29
(a)
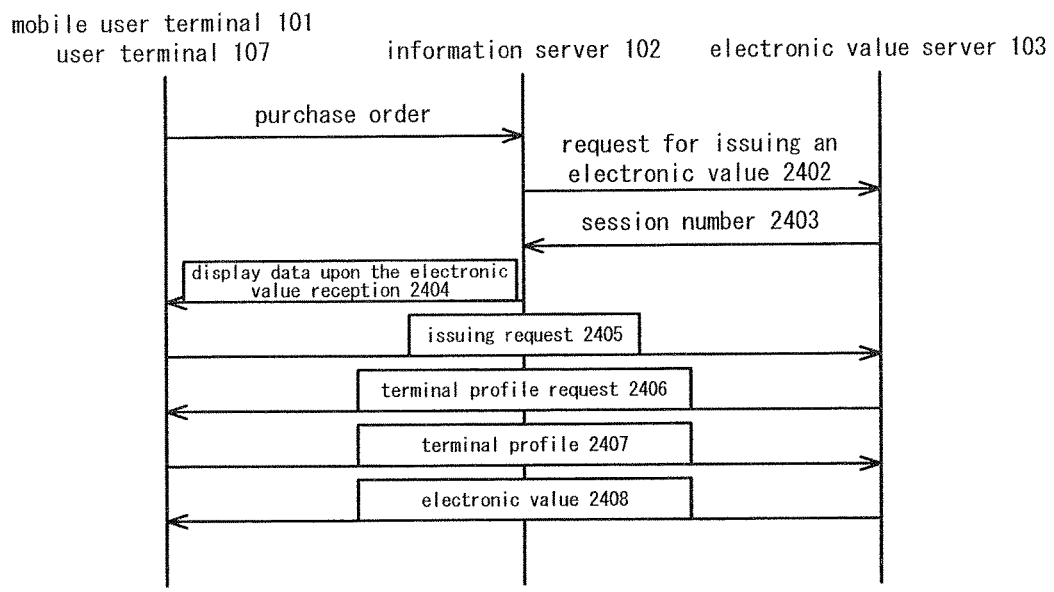
(b)
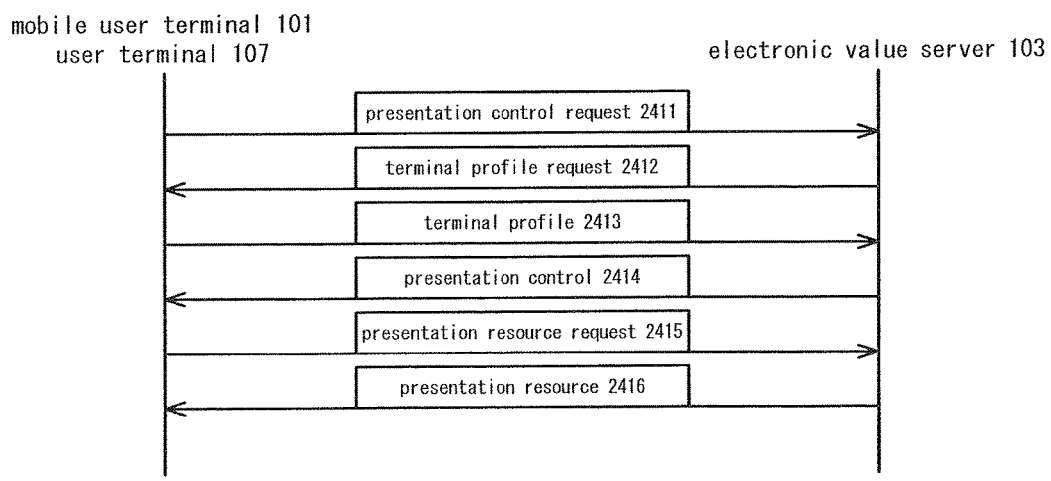

*Fig. 30*

(a)
```
<Description about="evIssuingRequest" ID="1000000000000123">
    <evType>ticket<evType>
    <evCode>00003000000000201</evCode>
    <evProp name="SEAT_NUM" value==" SS-A-28"/>
    <evProp name=" SEAT_POS" value=" http://www.mts.com/ticket123/seat/SS-A-28"/>
</Description>
```

(b)
```
<Description about="TerminalProfile" >
    <TerminalType>MT0001</TerminalType>
    <BrowserType>B000B20A</BrowserType>
    <eWalletType>W000A10B</eWalletType>
    <Screen>160x200x8</Screen>
</Description>
```

Fig. 32

```
<EVML version="0.1">
  <Description about="http://www.evalue.com/evalue/10000000000000000000000000000001">
    <SignedDescription about="PresentationCard" evID="10000000000000000000000000000001">
      :
      <Signer rdf:resource="http://www.evalue.com"/>
      <Signature>0123456789</Signature>
    </SignedDescription>
```
⟵ 801 presentation card

```
    <SignedDescription about="VriableProperty" evID="10000000000000000000000000000001">
      :
      <Signer rdf:resource="http://www.evalue.com/evalue/10000000000000000000000000000001"/>
      <Signature>123456789A</Signature>
    </SignedDescription>
```
⟵ 802 variable property

```
    <SignedDescription>
      <Description about="ServiceCtrl" evID="10000000000000000000000000000001">
        :
      </Description>
```
⟵ 803 service control

```
      <Description about="SecurityInf" evID="10000000000000000000000000000001">
        :
      </Description>
```
⟵ 804 security information

```
      <Description about="RepresentaionCtrl" evID="10000000000000000000000000000001"
        rdf:resource="http://www.evalue.com/evalue/ev_0000300000000201/RpCtrl"/>
```
⟵ 805 presentation control

```
      <Description about="RepresentaionRes" evID="10000000000000000000000000000001"
        rdf:resource="http://www.evalue.com/evalue/ev_0000300000000201/RpRes"/>
```
⟵ 806 presentation resource

```
      <SignedTime>1999.09.07T12:15:07+0900</SignedTime>
      <Signer rdf:resource="http://www.evalue.com"/>
      <Signature>23456789AB</Signature>
    </SignedDescription>

<SignedDescription about="http://www.evalue.com/evalue/ev_0000300000000201/RpCtrl"
      evID="10000000000000000000000000000001">
      :
      <Signer rdf:resource="http://www.evalue.com"/>
      <Signature>3456789ABC</Signature>
    </SignedDescription>
```
⟵ 1201 presentation control (entity)

```
    <Description about="http://www.evalue.com/evalue/ev_0000300000000201/RpRes"
      evID="10000000000000000000000000000001">
      :
    </Description>
```
⟵ 1202 presentation resource (entity)

```
    <Description about="http://www.evalue.com">
      <EntityName>Mobile Ticket Service</EntityName>
      <EntityID>00000000000000000000000000000001</EntityID>
      <Email>ev_issuer@evalue.com</Email>
      <Telnum>81-3-5460-xxxx</Telnum>
    </Description>
  </Description>
</EVML>
```
⟵ 1200 description about service provider Fig. 33
(a) 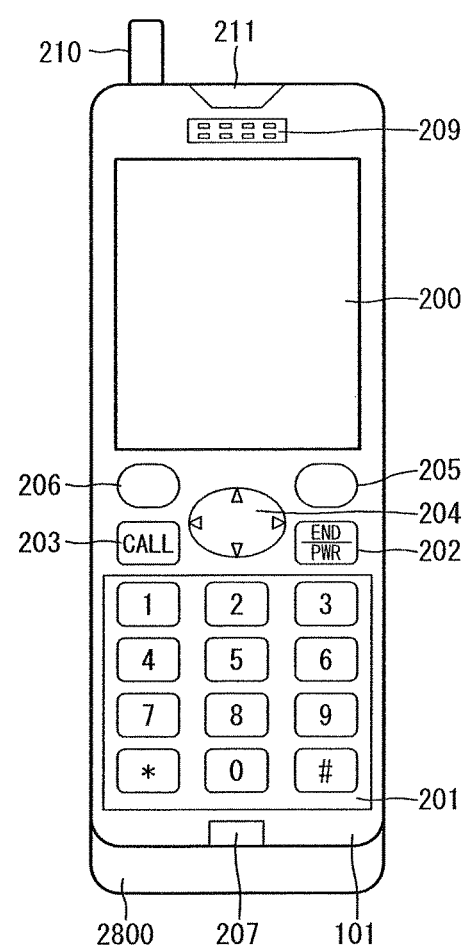
(b) 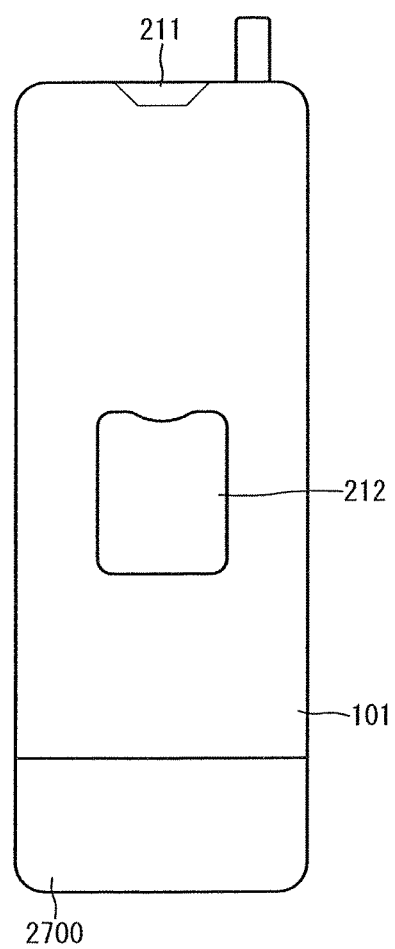

Fig. 36
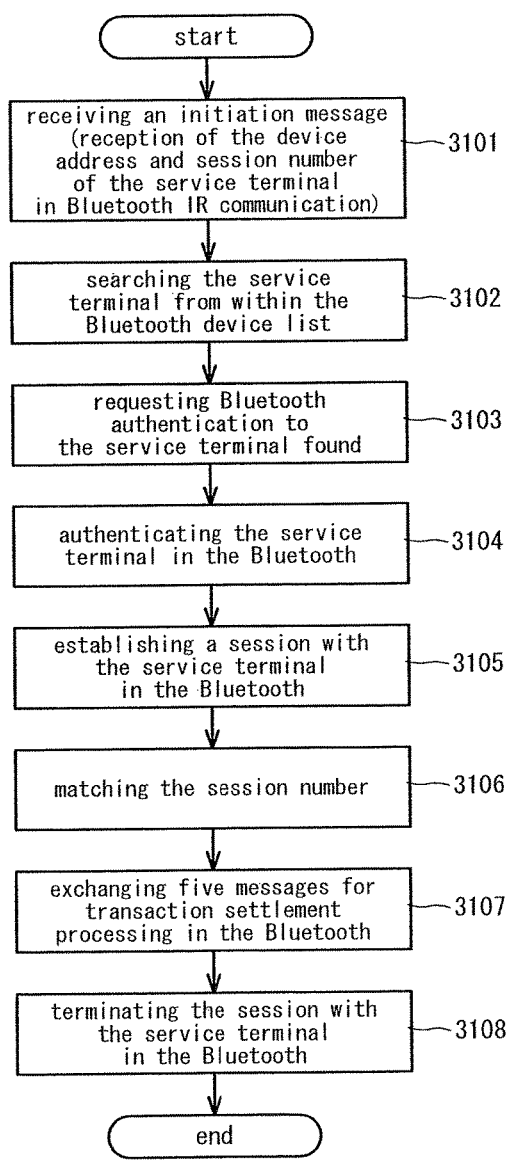
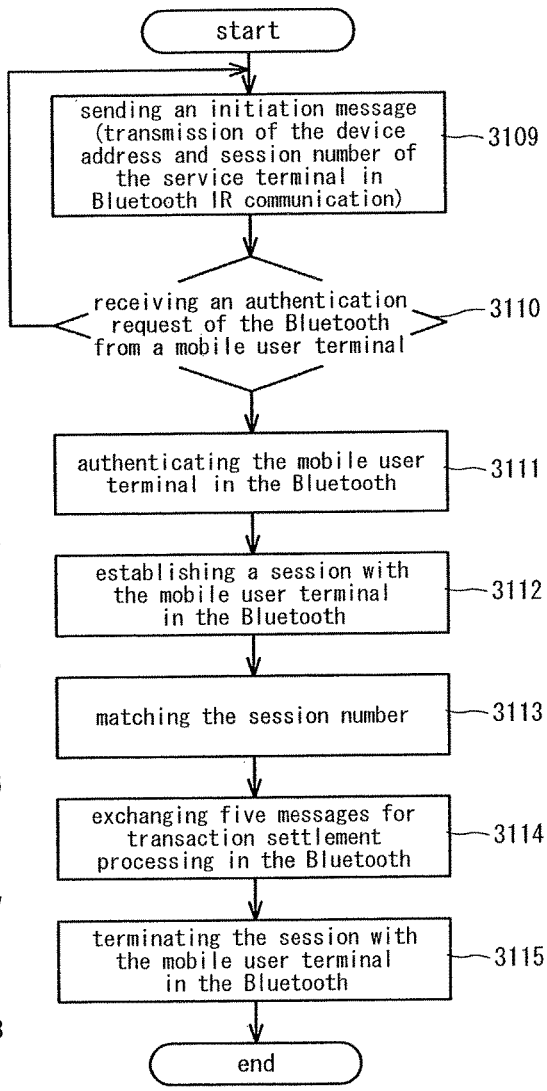

COMMUNICATION TERMINAL AND COMMUNICATION METHOD USING PLURAL WIRELESS COMMUNICATION SCHEMES

TECHNICAL FIELD

The present invention relates to an electronic commerce system, which may provide settlement facility in wholesale transactions represented by, for example, prepaid cards and credit cards (banking cards), transaction settlement facility of such tickets as events, seminars, movies and the like, and sales facility of the prepaid cards and tickets, and more particularly to an electronic commerce system, which allow transactions to be convenient, efficient and smooth with the safety of settlements assured.

BACKGROUND ART

In recent years there have been many attempts electronizing the value information including electronic money and tickets in order to achieve a higher efficiency in distribution systems.

One of such attempts uses a markup description language to define the property of value information, digitally sign thereon by the owner to allow the value information to pass current. Now referring to FIG. 1(a), there is shown a schematic diagram in which a center server 3300 owned by an issuer of the value information issues the electronized value information 3303 to an IC card 3301 of a user, in accordance with the Prior Art. The value information 3303 stored in the IC card 3301 has its property described in a markup language, and digitally signed by the issuer thereof on its entirety in order to protect it against any unauthorized alteration. Referring to FIG. 1(b), there is shown a schematic diagram in which the value information 3303 electronized in accordance with the Prior Art is used with a merchant. The value information 3304 stored in the terminal 3302 of merchant is derived from the value information 3303 stored in the IC card 3301 in addition to certain information indicating the transfer of owner, and is digitally signed by the user in order to protect it against any unauthorized alteration. Since the information is not updated but added, this is a method highly secured against any iniquity including alteration, which may circulate the electronized value information in a secure environment.

Another settlement scheme has been proposed, which uses local wireless communication so-called "Bluetooth" between a portable terminal to which the IC card storing the electronized value information is inserted and the POS terminal of a retail store in order to process the settlement such a payment.

However, in accordance with the Prior Art technology, the data size of the electronic value information may grow each time the value information is transacted, causing inconvenience in processing.

In addition, the Prior Art methods are required for certificates of both parties to be exchanged in order to authenticate the digital signatures at the time of transmitting the electronic value information. This is a problem that the anonymity may not be ensured.

Furthermore, the Prior Art methods have another problem that the prepaid cards or tickets may not be systematically processed because every methods of value information transaction use respective proprietary scheme different each other.

Finally, in the Prior Art methods, since the electronic value information is stored in the IC cards, the data size of the electronic value information is limited. And this is still another problem on the expressiveness of the value information that the multimedia information including images cannot be stored. Also, in the Prior Art methods the other party to communicate with in the Bluetooth environment needs to be identified prior to beginning of settlement process. This may cause a problem that, when a plurality of POS terminals are placed side by side in particular, a certain complex operation such as inputting the identification number of the POS terminal of the other party is needed.

DISCLOSURE OF THE INVENTION

The present invention has been made in view of the above circumstances to overcome the above problems and the primary object is to provide an electronic wallet, which may efficiently electronize the value information to generate the electronic value, and which is eminent in the anonymity, security and convenience.

A secondary object of the invention is to provide an electronic wallet, with which users may efficiently use various electronic value information.

To achieve the above objects and in accordance with the purpose of the invention, as embodied and broadly described herein, this invention comprises an electronic wallet comprising means for storing and managing electronic information, the data structure of which includes a private key, certificate, and information signed by a service provider (i.e., the provider of this electronic wallet system in accordance with the invention) by means of the private key. More specifically, in accordance with the invention, each electronic information item stored in the electronic wallet incorporates respectively an inherent private key associated therewith, the value information within the electronic information item may be accessed oOnly when the private key is unlocked.

Therefore, the validity of the electronic information may be proved by itself. Even when a private key of one electronic information item has been deciphered by a third party, other electronic information items are secured, protected by other private keys, certificates, and signatures by the private keys so as to ensure the anonymity at a higher level.

BRIEF DESCRIPTION OF THE DRAWINGS

FIG. 1(a) is a schematic block diagram in which the value information electronized in accordance with the Prior Art is used; (b) is a schematic block diagram in which the value information electronized in accordance with the Prior Art is used.

FIG. 7(*a*) is a schematic front view of a mobile user terminal in accordance with the first embodiment of the invention and (*b*) is a schematic rear view of the mobile user terminal;

FIG. 17 is a schematic diagram of coding of electronic value, written in a markup language, stored in an electronic wallet in accordance with the first embodiment of the invention;

FIG. 18 is a schematic diagram of coding of the presentation card and variable property of the electronic value, written in a markup language, in accordance with the first embodiment of the invention;

FIG. 19 is a schematic diagram of coding of service control and security information of the electronic value, written in a markup language, in accordance with the first embodiment of the invention;

FIG. 20 is a schematic diagram of coding of presentation control of the electronic value, written in a markup language, in accordance with the first embodiment of the invention;

FIG. 21 is a schematic diagram of coding of presentation resource of the electronic value, written in a markup language, in accordance with the first embodiment of the invention;

FIG. 22 is a schematic diagram of coding of display information "Main", written in a markup language, generated by an electronic value object, in accordance with the first embodiment of the invention.

FIG. 23 is a schematic diagram of coding of electronic value handler, written in a markup language, in accordance with the first embodiment of the invention;

FIG. 24(*a*) is a schematic diagram of the data structure of service control message in the message presentation during the transaction settlement processing in accordance with the first embodiment of the invention, (*b*) is a schematic diagram of the data structure of service control message in the message instruction during the transaction settlement processing in accordance with the first embodiment of the invention, (*c*) is a schematic diagram of the data structure of service control message in the message transaction during the transaction settlement processing in accordance with the first embodiment of the invention, and (*d*) is a schematic diagram of the data structure of service control message in the message receipt during the transaction settlement processing in accordance with the first embodiment of the invention;

FIG. 25 is a schematic diagram of coding of the variable property of electronic value, written in a markup language, after the transaction settlement processing in accordance with the first embodiment of the invention;

FIG. 26 is a schematic diagram of data for prompting the receiving operation of electronic value transmitted from the information server to a browser in accordance with the first embodiment of the invention;

FIG. 29(*a*) is a flow chart illustrating the procedure of issuing electronic value in accordance with the first embodiment of the invention, and (*b*) is a flow chart illustrating the procedure of downloading the presentation control and presentation resource of electronic value in accordance with the first embodiment of the invention;

FIG. 30(*a*) is a schematic diagram of coding of electronic value issuing request, written in a markup language, in accordance with the first embodiment of the invention, and (*b*) is a schematic diagram of coding of terminal profile, written is a markup language, in accordance with the first embodiment of the invention;

FIG. 32 is a schematic diagram of coding of electronic value, written in a markup language, registered in an electronic value database of an electronic value server in accordance with the first embodiment of the invention;

FIG. 33(a) is a schematic front view of a mobile user terminal in accordance with a second embodiment of the invention, and (b) is a rear view of a mobile user terminal in accordance with the second embodiment of the invention;

FIG. 36(a) is a flow chart of the transaction settlement processing in a mobile user terminal in case of pattern 1 in accordance with the second embodiment of the invention, and (b) is a flow chart of the transaction settlement processing in a service terminal in case of pattern 1 in accordance with the second embodiment of the invention.

PREFERRED EMBODIMENTS OF THE INVENTION

Figure 2:
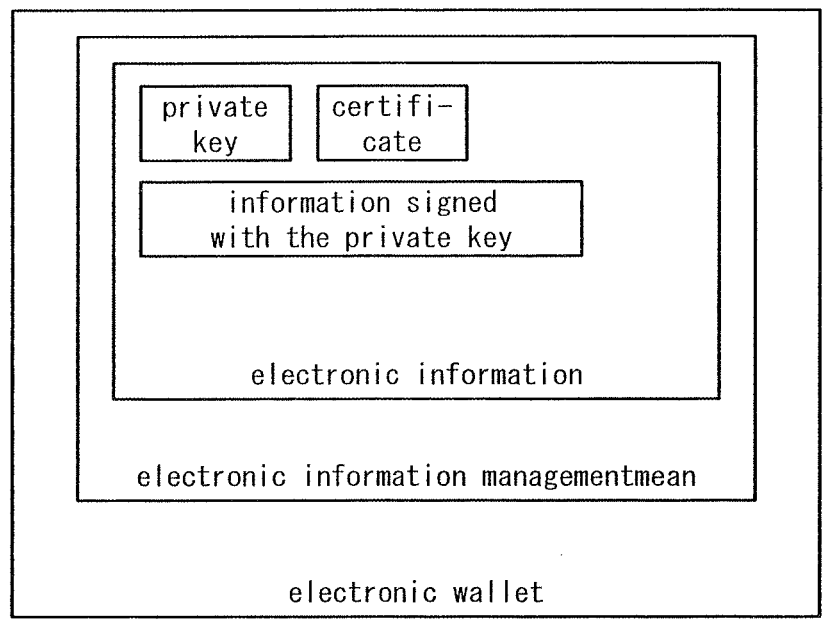
FIG. 2 is a schematic diagram illustrating the basic structure of an electronic wallet in accordance with the invention.

A detailed description of one embodiment embodying the invention will now be given referring to the accompanying drawings. Now referring to FIG. 2, there is shown the basic structure of an electronic wallet in accordance with the invention. As shown in the figure, the electronic wallet 1 has an electronic information management means 2 for storing and managing information including valuable information. The electronic information 3 is stored in the electronic information management means 2. The electronic information 3 is comprised of, in addition to the valuable information of the core data body of this electronic information, a private key 4 mated with its certificate 5 specific to that electronic information 3, and the information 6 is signed by the private key. In FIG. 1, although there is shown only one electronic information 3 set in the electronic information management means 2, in practice a plurality of electronic information 3 sets will be stored in the electronic information management means 2. As can be appreciated the validity of electronic information may be proved by itself because of the private key 4 and the certificate 5 incorporated in the electronic information 3, so as to maintain the anonymity.

Figure 3:
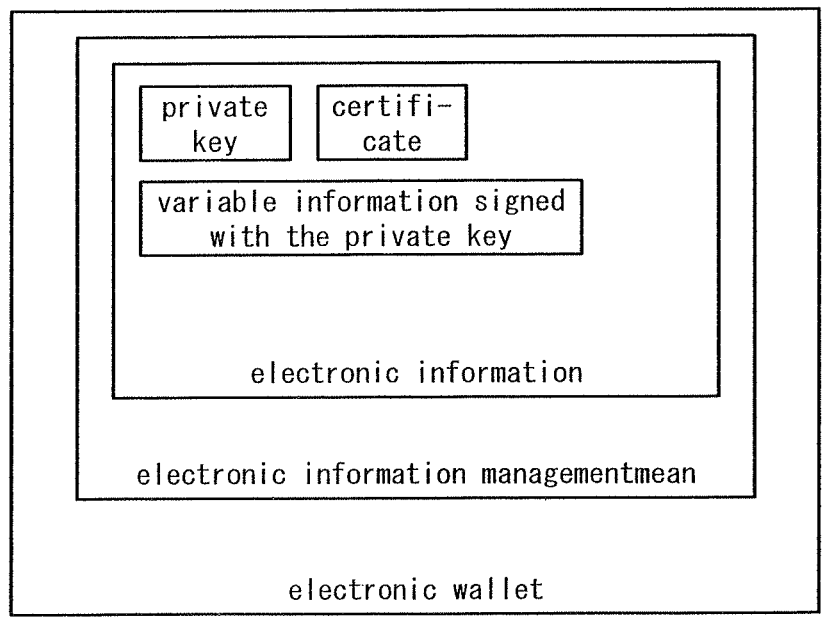
FIG. 3 is a schematic diagram illustrating that the information signed by private key is variable in the electronic wallet shown in FIG. 2.

Now referring to FIG. 3, there is shown a schematic diagram indicating that the information signed by the private key 4 is variable in the electronic wallet 1 shown in FIG. 2. The electronic information 3 is comprised of a private key 4 mated with its certificate 5 both specific to that electronic information 3, and variable information 7 signed by the private key 4. The anonymity may be increasingly improved since the variable information 7 is signed by the private key 4 means that the signature by the private key 4 is updated each time the information is varied, i.e., each time the data is altered.

Figure 4:
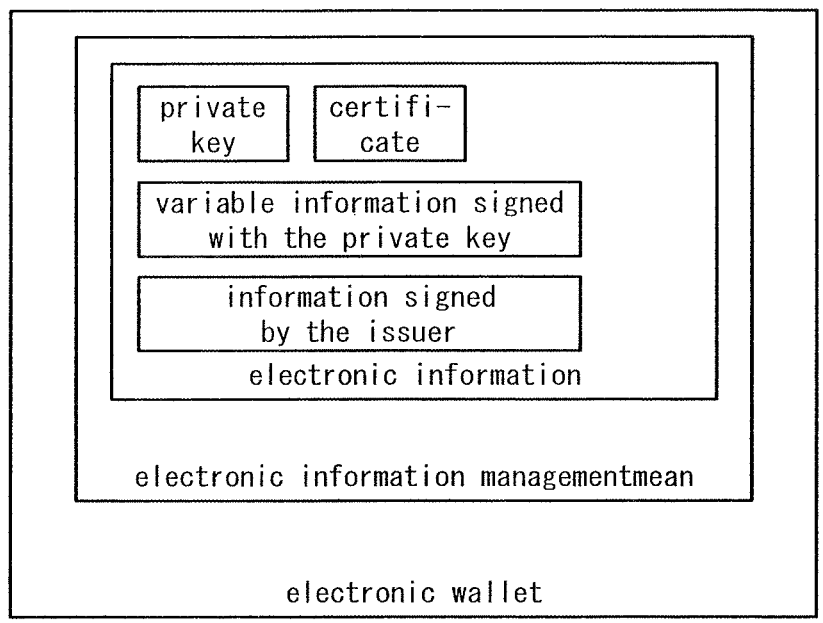
FIG. 4 is a schematic diagram illustrating that the electronic information stored in the electronic wallet shown in FIG. 3 includes information signed by the issuer of the information.

Now referring to FIG. 4, there is shown a schematic diagram illustrating that the electronic information 3 stored in the electronic wallet 1 shown in FIG. 3 has information 8 signed by the issuer of that information. The electronic information 3 is comprised of a private key 4 mated with its certificate 5 both specific to the electronic information 3, variable information 7 signed by the private key 4, and information 8 signed by the issuer of the electronic information. This structure has not only the variable information 7 signed by the private key 4, but also the information 8 signed by the issuer of the information, so that the validity of the variable information in the electronic information may be proved by itself so as to further ensure the anonymity.

Figure 5:
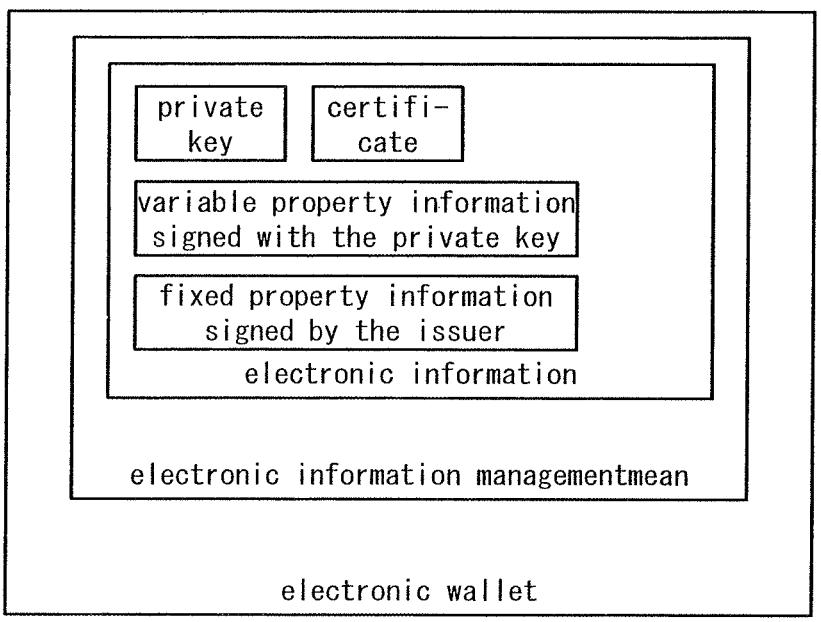
FIG. 5 is a schematic diagram illustrating that the information signed by a private key is variable in the electronic wallet shown in FIG. 4 and that the information signed by the issuer of the information is invariable.

Now referring to FIG. 5, there is shown a schematic diagram illustrating that in the electronic wallet 1 shown in FIG. 4 the information signed by the private key 4 is variable property information used as variable information, and the information 8 signed by the issuer is fixed property information used as invariable information. The electronic information 3 is comprised of a private key 4 mated with its certificate 5 both specific to the electronic information 3, variable property information 9 signed by the private key 4, and invariable, fixed property information 10 signed by the issuer of the electronic information. As an example, the variable property information herein may correspond to the data in a book of transport coupons, the available number of which is decreased each time the coupon is used. The invariable property information in this example of transport coupons, may correspond to the data including the expiration and valid course of the book. The variable property information is signed by the private key 4 each time the data is rewritten, so that the validity of the variable property information may be proved by itself so as to further ensure the anonymity. The fixed property information, on the other hand, is signed by the issuer of the electronic information, so that the validity of the property information may be proved by itself so as to increasingly ensure the anonymity.

It should be appreciated by those skilled in the art that the invention encompasses any other aspects embodied by selecting either one of the above information 6, variable information 7, or variable property information 9 for the information signed by the private key 4, and be selecting either one of the above information 8 or fixed property information 10.

In accordance with the invention, the information signed by the private key is also variable property information, as similar to the electronic information 3 stored in the electronic wallet 1 shown in FIG. 5, and the fixed property information and presentation control information both signed by the issuer of the electronic information are provided, so that display data may be generated from all three kinds of information.

Also in accordance with the invention, the information signed by the private key is variable property information, as similar to the electronic information 3 stored in the electronic wallet 1 shown in FIG. 5, and the fixed property information signed by the issuer of the electronic information, as well as the information for obtaining presentation control information may be provided.

Furthermore, in accordance with the invention, the information signed by the private key is variable property information, as similar to the electronic information 3 stored in the electronic wallet 1 shown in FIG. 5, and the fixed property information signed by the issuer of the electronic information, as well as the information for obtaining presentation control information may be provided.

Furthermore, in accordance with the invention, the information signed by the private key is variable property information, as similar to the electronic information 3 stored in the electronic wallet 1 shown in FIG. 5, and the fixed property information signed by the issuer of the electronic information as well as the identification information of presentation resources signed or not signed by the issuer of the electronic information may be provided, so that display data may be generated from those three kinds of information.

Also, in accordance with the invention, the information signed by the private key is variable property information, as similar to the electronic information 3 stored in the electronic wallet 1 shown in FIG. 5, and the fixed property information signed by the private key may be provided, as well as the identification information of display control information, in addition to information for obtaining display resource signed or not signed by the issuer of electronic information may be further provided.

Furthermore, in accordance with the invention, the information signed by the private key is variable property information, as similar to the electronic information 3 stored in the electronic wallet 1 shown in FIG. 5, and fixed property information signed by the issuer of the electronic information may be provided, as well as the authentication key of the electronic information handler may be incorporated in order the foe electronic information handler to perform the settlement process with a terminal having electronic information.

In addition, in accordance with the invention, the information signed by the private key is variable property information, a similar to the electronic information 3 stored in the electronic wallet 1 shown in FIG. 5, and fixed property information signed by the issuer of the electronic information may be provided, as well as the information for obtaining the presentation control information, the information for obtaining the presentation resource, and the authentication key of the electronic information handler may be provided.

Also in accordance with the invention, the information signed by the private key is variable property information, as similar to the electronic information 3 stored in the electronic wallet 1 shown in FIG. 5, and fixed property information signed by the issuer of the electronic information may be provided, as well as the service control information may be provided so as to regulate by the service control information the settlement process using the electronic information.

In addition, in accordance with the invention, the information signed by the private key is variable property information, as similar to the electronic information 3 stored in the electronic wallet 1 shown in FIG. 5, and fixed property information signed by the issuer of the electronic information may be pOrovided, as well as the information for obtaining the presentation control information, information for obtaining the presentation resource, the authentication key of the electronic information handler, and the service control information may be further provided.

Also in accordance with the invention, means for controlling the electronic information by generating electronic information object from the electronic information, so as to enable the transaction settlement data based on the service control information to be embedded in each message to be exchanged when the electronic information object performs the transaction settlement. This allows the security to be improved without increasing the amount of data since the electronic information object updates and signs to the electronic information.

In addition, in accordance with the invention, the service control information may be composed of a combination of service control module information.

Still further in accordance with the invention, when the electronic information object performs the settlement, the transaction settlement message on the basis of the service control information that will be embedded into each messages exchanged at the time of settlement may be a message from the electronic information requesting the transaction settlement to the electronic information handler. The transaction settlement processing in various electronic information may be processed in a manner highly effective.

Yet in accordance with the invention, when the electronic information object performs the settlement, the settlement message on the basis of the service control information embedded into each message to be exchanged at the time of the settlement may be the message from the electronic information handler to the electronic information for instructing the update of property values. This allows the settlement in various electronic information to be performed at higher efficiency.

Also further in accordance with the invention, when the electronic information object performs the settlement, the settlement message on the basis of the service control information embedded into each message to be exchanged at the time of the settlement may be the message from the electronic information to the electronic information handler for indicating the result of update of the property values. This allows the settlement in various electronic information to be performed at higher efficiency.

Also in accordance with the invention, when the electronic information object performs the settlement, the settlement message on the basis of the service control information embedded into each message to be exchanged at the time of the settlement may be a message that may correspond to a receipt from the electronic information handler to the electronic information. This allows the settlement in various electronic information to be performed at higher efficiency.

EMBODIMENTS

Two embodiments of the invention will be described in greater details below with reference to FIG. 6 through FIG. 37. It should be noted here that those skilled in the art may appreciate that the invention may not be limited to the following disclosure, which are for solely the purpose of illustration thereof, and that the invention may be embodied in other specific forms without departing from the spirit or essential characteristics thereof. The accompanying drawings will be referred to as FIG. 6, FIG. 7 . . . .

First Embodiment

A practical embodiment of the invention is a mobile electronic commerce system, in which system any individual buyer-user may purchase over the network any tickets, prepaid cards and the like as electronic information, and that the examination of tickets and transaction settlement of purchase communication, without presenting a ticket to clerk at the time of examination of tickets, or without delivering cash and receipts with a salesperson at the time of purchase of a merchandise in a wholesale store.

In the following description, this system as have been described above will be referred to as "mobile electronic commerce system". The aggregation consisted of any electronic tickets and prepaid cards that are dealt with in the present system will be referred to as "electronic value", as well as the entirety consisted of a variety of services provided by the system will be referred to as "mobile electronic commerce service", herein below.

Figure 6:
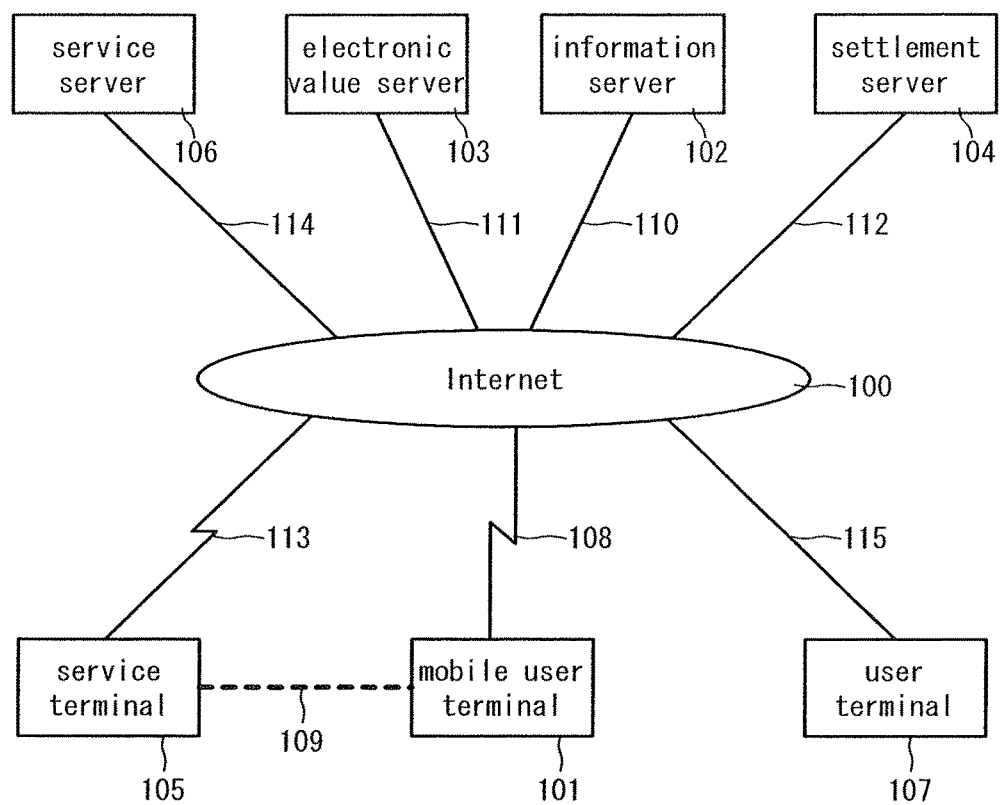
FIG. 6 is a schematic block diagram of a mobile electronic commerce system in accordance with a first embodiment of the invention.

The mobile electronic commerce system may include, as shown by the system architecture in FIG. 6, a mobile user terminal 101 incorporating bidirectional wireless communication facility in two methods, browsing facility, and electronic wallet facility; a user terminal 107 incorporating a bidirectional wireless communication facility, browsing facility, and electronic wallet facility; a service terminal 105 for the transaction settlement processing of electronic value; a service server 106 for serving for the online transaction settlement processing of electronic value; a settlement server 104 for serving for the debit of bank accounts, credit card accounts, or settlement institutions; an information server 102 for providing online information concerning electronic value and for vending electronic value; an electronic value server 103 for generating and issuing electronic value, wherein these services are interconnected online over the Internet 100. The service server 106, settlement server 104, information server 102, and electronic value server 103 are systems formed by one or a plurality of computers, respectively.

The mobile user terminal 101 may be a portable wireless telephone (cellular) terminal having two bidirectional wireless communication facilities, for the infrared (IR) and digital wireless communication, browsing facility, and electronic wallet facility.

The service terminal 105 may have two bidirectional wireless communication facilities, for IR communication and digital wireless, and may be of standalone or portable installation in accordance with the application.

In FIG. 6, the reference numerals 108 and 113 are digital wireless communication lines for accessing the Internet 100 from the mobile user terminal 101 and the service terminal 105, respectively. The reference numeral 109 may be an IR transmission line used by the mobile user terminal 101 to the service terminal 105, and the reference numerals 110, 111, 112, 114, and 115 are digital communication channels for accessing the Internet 100 from the information server 102, electronic value server 103, settlement server 104, service server 106, and user terminal 107, respectively.

Ordinary operational mode of the mobile electronic commerce system can be assumed as follows:

The settlement server 104 may be installed in a bank, a credit card company, or settlement organization. The information server 102 may be installed in an organization that provides information concerning the electronic value online, and sells the electronic value online, such as an event producer, ticket issuer, wholesale store, or a prepaid card company.

The service terminal 105 may be installed at the entrance in a movie theater or an event arena, or at the POS checkout stations in a store if the terminal is of standalone type, and may be carried by a salesperson or money collector if the terminal is portable. The service server 106 may be installed in a firm providing services compatible with the electronic value such as an online shop and Internet broadcasting.

The mobile user terminal 101 may be carried by the consumer, while the user terminal 107 may be installed at the home of the consumer.

The electronic value server 103 may be installed in an organization that provides the mobile electronic commerce system.

The connections including the interconnection between devices forming collectively the mobile electronic commerce system, and the social relationship among the owners of such system, can be assumed as follows:

The consumer-owner who possesses the mobile user terminal 101 has a contract of accounting with a bank or a credit card company, and another contract of membership of mobile electronic commerce system with the service provider of mobile electronic commerce system.

The owner of the service terminal 105 and the owner of the service server 106 may enter into a contract of franchise system with the mobile electronic commerce system service provider. It should be noted here that the service terminal 105 owner or service server 106 owner may also be the same mobile electronic commerce system service provider.

The owner of the service server 106 may enter a contract with the mobile electronic commerce system service provider in order for the electronic value server 103 to issue electronic value in response to the request from the service server 106. It should be noted her also that the service server 106 owner may be the same service provider of the mobile electronic commerce system.

In order to simplify the description on the present novel system herein below, the consumer-owner of the mobile user terminal 101 will be referred to as "user", the business entity that possesses the service terminal 105 or the service server 106 and sells or provides merchandises and services as "merchant", the company that possesses the electronic value server 103 to provide the mobile electronic commerce service as "service provider", the institution that possesses the settlement server 104 to process the transaction settlement of accounts such as banks, credit card companies, or settlement organizations as "transaction processor", and the association that possesses the information server 102 for providing information concerning the electronic value online and selling the electronic value as "electronic value seller".

The mobile electronic commerce service provided by the system in accordance with the invention is an electronic service, which may processes the purchase and sale of tickets and prepaid cards via the network, the delivery along therewith, and the exercise of tickets and cards.

More specifically, a user may use his/her mobile user terminal 101 to place a purchase order of electronic value to the information server 102 via the Internet, then receive electronic value generated by the electronic value server 103 on the basis of a request of issuing electronic value from the information server 102 to the electronic value server 103 to store and manage it into the mobile user terminal 101. For using the purchased electronic value, the mobile user terminal 101 may perform data communication with the service terminal 105 or service server 106 to adduce the electronic value stored in the mobile user terminal 101 to exchange the transaction information of electronic value therewith and transact the electronic value, and then the merchant will deliver a service or product. The transaction process along with the purchase and sale of electronic value will be performed between the information server 102 and the settlement server 104. The details of mobile electronic commerce service will be described later.

In mobile electronic commerce service, data communication among devices of the present system will be carried out over the transmission line or communication channel as described below. The mobile user terminal 101 may perform digital communication with the information server 102 through the transmission line 108, Internet 100, and digital communication channel 110, may digitally communicate with the electronic value server 103 through the transmission line 108, Internet 100, and digital communication channel 111, may also digitally communicate with the service server 106 through the transmission line 108, Internet 100, and digital communication channel 111, and may perform IR communication with the service terminal 105 through a transmission line 109.

In the communication between the mobile user terminal 101 and electronic value server 103, communication between the mobile user terminal 101 and service terminal 105, and communication between the mobile user terminal 101 and service server 106, any transaction information will be encrypted. For the encryption, a combination of the private key encryption and the public key encryption are used for encapsulate information into an envelope before communication.

Components of the present system will then be described below in greater details.

At first the service terminal 105 will be detailed.

Figure 11:
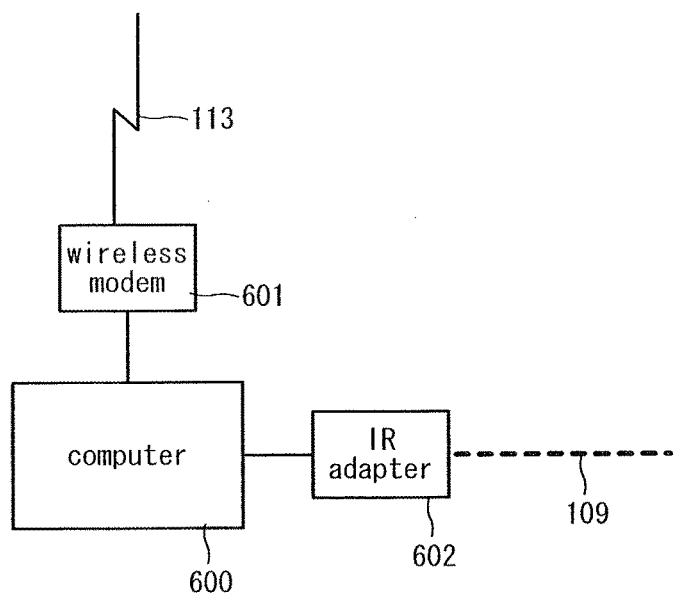
FIG. 11 is a schematic block diagram of a service terminal in accordance with the first embodiment of the invention.

Now referring to FIG. 11, there is shown a schematic block diagram of a service terminal 105. In FIG. 11, the service terminal 105 is consisted of a computer 600, a wireless modem 601, and an IR communication adapter 602. The service terminal 105 has two communication facilities, for digital wireless communication and IR. The digital wireless communication is used for accessing to Internet, while the IR communication facility is used for the electronic value transaction with the mobile user terminal. The computer 600 may incorporate a merchant application program, with which the computer 600 controls the wireless modem 601 and the IR communication adapter 602 to perform the transaction, based on this merchant application. In a similar manner, the service server 106 may also incorporate a merchant application, with which the service server 106 performs the electronic value transaction, based on this merchant application. The detailed operation of the service terminal 105 and service server 106 will be described later.

Next, the user terminal 107 will be detailed.

Figure 12:
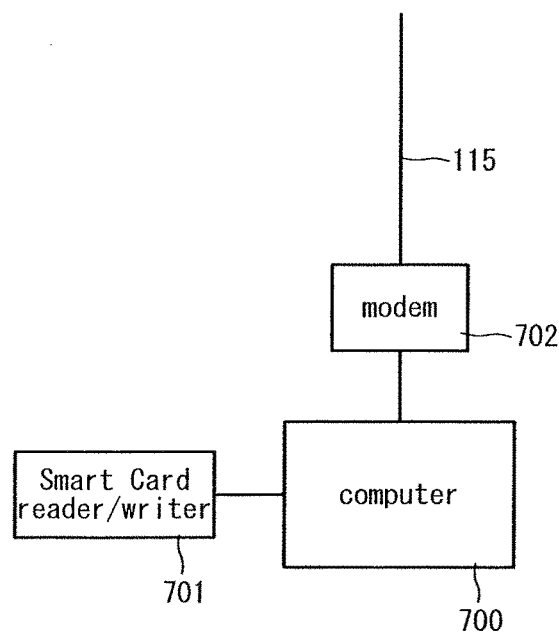
FIG. 12 is a schematic block diagram of a user terminal in accordance with the first embodiment of the invention.

Now referring to FIG. 12, there is shown a schematic block diagram of a user terminal 107. In FIG. 12, the user terminal 107 is consisted of a computer 700, a smart card reader/writer 701, and a modem 702. The user terminal 107 may incorporate a browser application program and an electronic wallet application program, and access the Internet via the modem 702. By inserting a smart card of the mobile user terminal 101 into the smart card reader/writer 701, the user terminal 107 may have the same functionality as the mobile user terminal 101 except for the transaction processing to and from a service terminal 105.

Next, the mobile user terminal 101 will be detailed.

Now referring to FIGS. 7(*a*) and (*b*), there are shown front and rear views of a mobile user terminal 101. In FIG. 7(*a*), the reference numeral 211 designates to an IR port (IR module) for IR communication with the service terminal 105; the reference numeral 210 to an antenna for transmitting and receiving RF waves of digital wireless communication; the reference numeral 209 to a receiver/speaker; the reference numeral 200 to a color liquid crystal display (LCD) device capable of displaying 120 by 160 pixels, the reference numeral 203 to an off-hook switch, the reference numeral 202 to an on-hook and power-off switch for both hanging on a call and powering off the device, the reference numeral 204 to a navigation switch, the reference numerals 205 and 206 to function switches, the reference numeral 201 to a ten-key pad, the reference numeral 207 to a microphone. In FIG. 7(*b*), the reference numeral 212 designates to a smart card slot (smart card reader/writer).

The mobile user terminal 101 has two communication facilities for the digital wireless communication and for the IR communication, the digital wireless facility is used for voice calls and internet accessing, as well as the transaction processing of electronic value with a service server, while the IR communication is used for the transaction processing of electronic value with a service terminal. The mobile user terminal 101 further has a browser facility and electronic wallet facility. The browser facility is used for browsing the Internet and the locally stored data in the mobile user terminal, and the electronic wallet facility is used for managing the electronic value and transaction.

Figure 8:
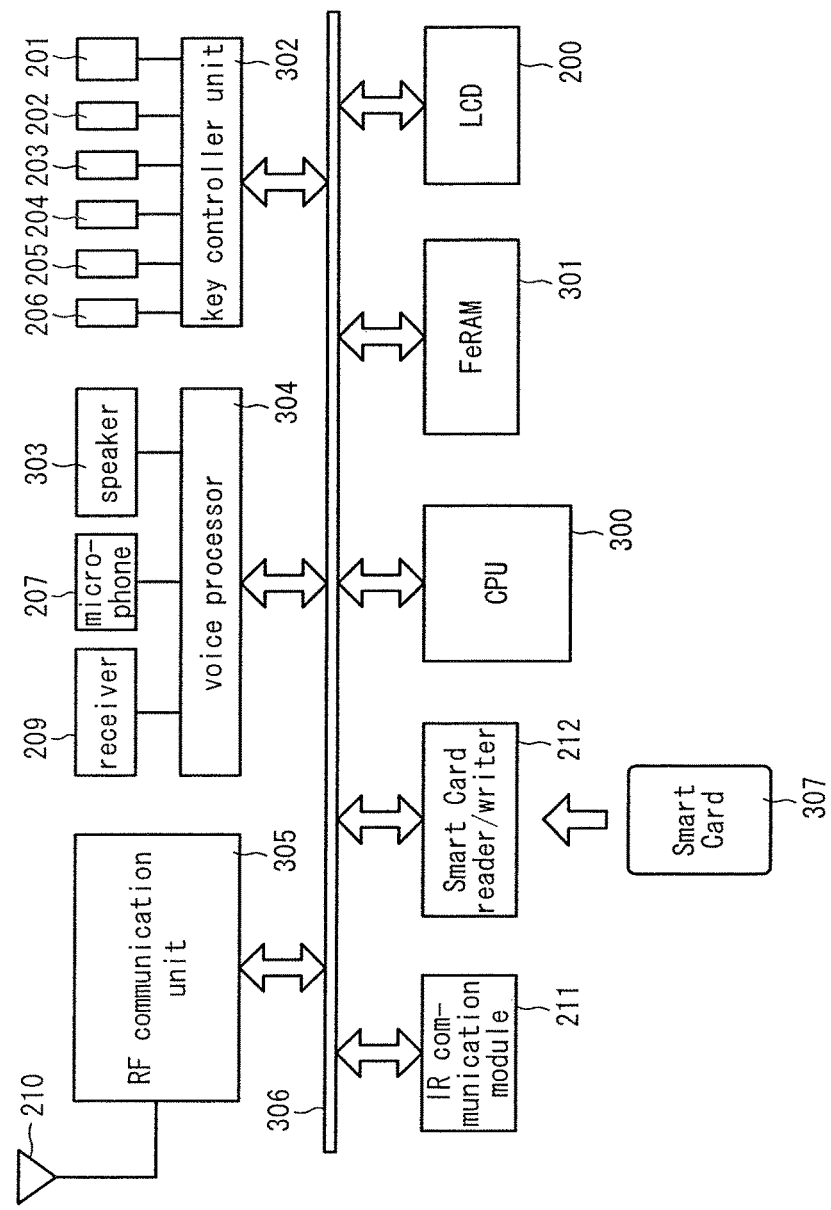
FIG. 8 is a schematic block diagram of a mobile user terminal in accordance with the first embodiment of the invention.

Now referring to FIG. 8, there is shown a schematic block diagram of a mobile user terminal 101. In FIG. 8, the mobile user terminal 101 comprises a FPU (central processing unit) 300 that operates based on a program stored in an FeRAM 301 (Ferroelectric Random Access Memory) 301 to process data stored in the FeRAM 301, transmit and receive data, and control other components via a bus 306; and LCD 200; an IR communication module 211; a smart card reader/writer 212; a ten-key pad 201; hung-on/power-off switch 202; a call switch 203; a navigation switch 204; function switches 205 and 206; a key controller 302 for detecting switch operation; voice processor 304 for driving a speaker 303 and a receiver 209 and digitally processing analog voice signals input from a microphone 207; RF communication unit 305 for controlling wireless data communication via an antenna 210 and wireless voice calls; and a smart card 307.

The smart card 307 may have therein a CPU and a non-volatile memory, which memory stores a universal personal telecommunication number (UPT; telephone number) of its user, a User ID in the mobile electronic commerce service, a user private key of the public key encryption method, a user certificate corresponding to the private key, as well as a certificate of the service provider (digital certificate of the service provider), electronic value that the user has already purchased, and receipts of the purchase of electronic value and for the transaction processing thereof.

In the FeRAM 301, in addition to the operating system (OS) and a phone program, two applications including a browser and an electronic wallet may be stored, which the CPU 300 may execute simultaneously.

Figure 9:
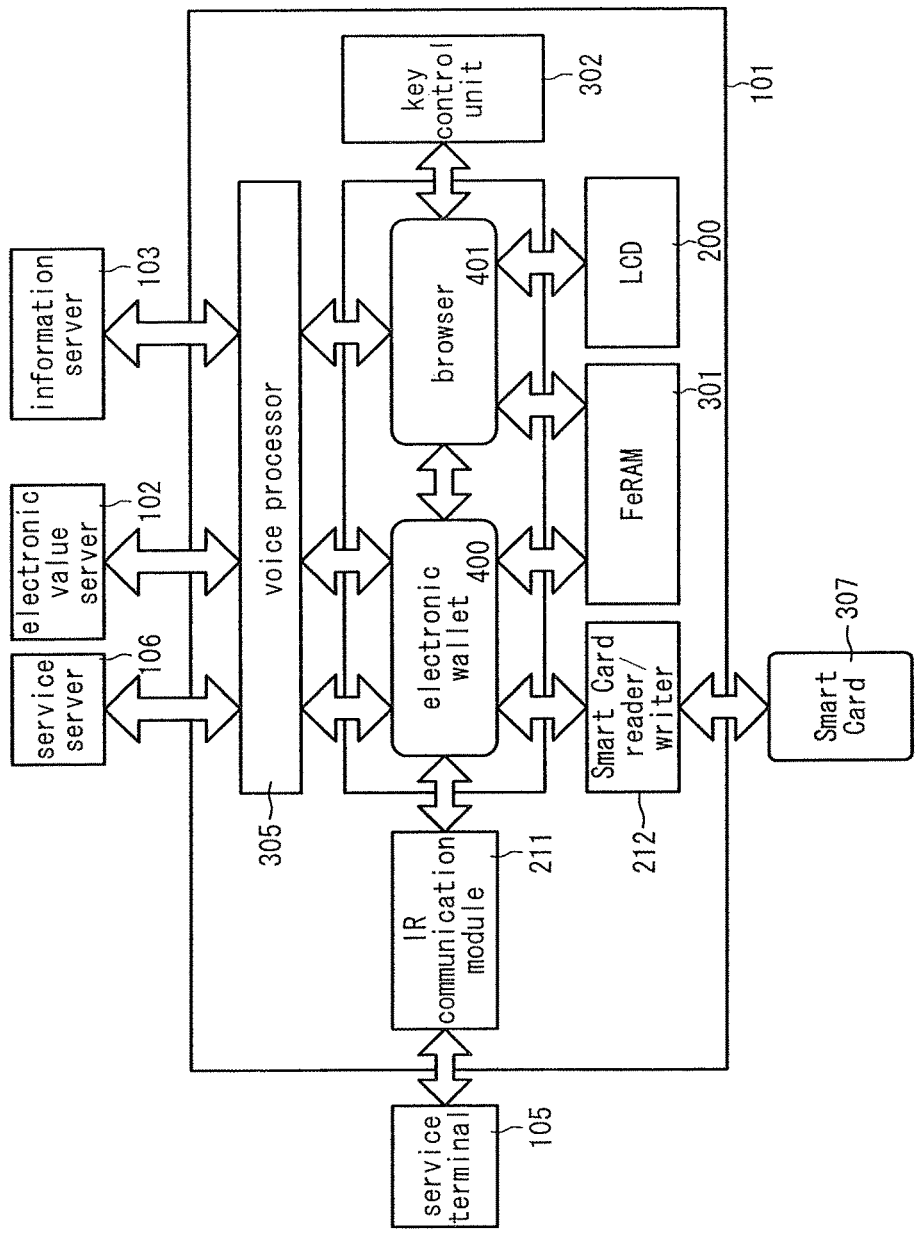
FIG. 9 is a schematic block diagram illustrating the relationship between applications in the mobile user terminal in accordance with the preferred embodiment of the invention and other components, as well as other equipments.

Now referring to FIG. 9, there is shown a schematic diagram illustrating the relationship among the applications (browser and electronic wallet) executable on the CPU 300, other components in the mobile user terminal 101, and other devices. In FIG. 4, the CPU 300 executes two processes, the browser 401 and electronic wallet 400.

The browser 401 may accept the user operation information (switch operation) sent from the key controller 302 to use the RF communication unit 305 to access the electronic value server 103 via the Internet 100. The browser 401 may also interpret data received from the electronic value server 103 to display on the LCD 200. The data received from the electronic value server 103 in this situation is written in a specific markup language, and the browser 401 interprets the markup language to restore image data to display on the LCD 200. In a similar manner, the browser 401 reads and interprets files stored in the FeRAM 301 or data received from the electronic wallet 400 to display on the LCD 200. Here the files stored in the FeRAM 301 and data received from the electronic wallet 400 are written in a specific markup language.

Figure 10:
FIG. 10(*a*) is a schematic diagram of a display screen of the mobile user terminal in accordance with the preferred embodiment of the invention when turned on, (*b*) is a schematic diagram of a display screen of the mobile user terminal in accordance with the preferred embodiment of the invention when displaying an internet menu, (*c*) is a schematic diagram of a display screen of the mobile user terminal in accordance with the preferred embodiment of the invention when displaying an ordering screen of the electronic value, (*d*) is a schematic diagram of a display screen of the mobile user terminal in accordance with the preferred embodiment of the invention when displaying password input screen, (*e*) is a schematic diagram of a display screen of the mobile user terminal in accordance with the preferred embodiment of the invention when displaying a list of electronic value, (*f*) is a schematic diagram of a display screen of the mobile user terminal in accordance with the preferred embodiment of the invention when displaying an electronic value screen, (*g*) is a schematic diagram of a display screen of the mobile user terminal in accordance with the preferred embodiment value receiving operation screen.

As an example, referring to FIG. 10(*a*), there is shown a "My Menu" display screen, which is presented on the LCD 200 at the power-on. When powering off by means of the hung-on/power-off switch 202, the browser 401 will read out the "My Menu" file stored in the FeRAM 301 to display the contents on the screen as shown in FIG. 10(*a*). The "My Menu" file is an operation menu of the mobile user terminal 101, written in a specific markup language.

Now assuming that the user selects from the menu item "1: Internet", then the browser 401 will access the Internet, and display an Internet Menu screen linked to the menu item "1: Internet", as shown in FIG. 10(b). Then the user may access to an Internet site, for example the information server 102, from this menu. FIG. 10(c) depicts an exemplary display screen when accessing to an information server 102 to place an order of electronic value.

Assuming that the user selects "2: E-Wallet" from the menu, the browser 401 may access to the electronic wallet 400, and display another screen for requesting a password input, based on the data received from the electronic wallet 400, as shown in FIG. 10(d). When the user inputs his/her password in this screen, the browser 401 in turn will send the password input to the electronic wallet 400. If the password is correct, the electronic wallet 400 will send data including a list of electronic value stored in and managed by the electronic wallet 400 to the browser 401. Then the browser 401 will display the screen as shown in FIG. 10(e). If the password is not correct, then an error will be displayed. Assuming that the user selects "7: Soccer 200× Japa" menu item, data indicating the contents of electronic value selected will be sent from the electronic wallet 400 to the browser 401, which then will display a screen as shown in FIG. 10(f). In the above situation, the data sent from the electronic wallet 400 to the browser 401 may be written in a specific markup language.

As shown in FIG. 10(a) to (f), the screen displayed on the LCD 200 by the browser 401 is composed of three areas, including a contents display area 500 for displaying the data received, a status display area 502 displayed on the top of the screen, and a menu display area 501.

The status display area 502 indicates to which site the terminal is connected, and whether the communication is secured or not. For example, in case of FIG. 10(c), the indication means that the displayed screen is resulted from accessing the Internet, the communication contents is secured to prevent listening therein. Also in case of FIG. 10(e), the indication says that the displayed screen is resulted from accessing the electronic wallet 400, the communication between the browser 401 and the electronic wallet 400 is secured to eliminate any listening therein.

The menu display area 501 is a function area deserved for indicating the functions allocated to the function switches 205 and 206. For example, in case of FIG. 10(a), a function that means "OK", or that selects is allocated to the function switch 205, another function that means "back", or that goes back is allocated to the function switch 206.

The electronic wallet 400, in response to the request from the browser 401, may receive the electronic value from the electronic value server 103, manage the electronic value stored in the smart card 307, and process transaction with the service terminal 105 or the service server 106.

For example, in the My Menu screen shown in FIG. 10(a), when the user is assumed to select a menu item "2: E-Wallet", which item is hyper-linked to a uniform resource identifier (URI) "wallet:///index". The browser 401 will then request to the electronic wallet 400 the index information of the electronic wallet, in other words the list of electronic value(s) stored in and managed by the electronic wallet 400. On the other hand, the electronic wallet 400 will reply to the browser 401 with a password input screen display data that is written in a specific markup language. When the password input by the user is sent back from the browser, the electronic wallet 400 will access the smart card 307 via the smart card reader/writer 212 to check the match between the input and the password stored in the smart card 307. If the password input is correct, i.e., the user is assumed to be authenticated, the electronic wallet 400 will reply to the browser 401 with the data indicating a list of electronic value(s) stored in the smart card 307, which data is written in specific markup language.

When in the list display of electronic value(s) shown in FIG. 10(e), assuming that the user selects a menu item "7: Soccer 200× Japa", which item is hyper-linked to a URI "wallet:///Evalue/ev00000033". The browser 401 will then request an electronic value managed under the identifier "ev00000033" to the electronic wallet 400. In reply, the electronic wallet 400 will access the smart card 307 via the smart card reader/writer 212 to generate an electronic value object on the basis of the electronic value data stored in the non-volatile memory of the smart card 307 and managed under the identifier "ev00000033". Then the electronic wallet 400 will request to thus generated electronic value object the data indicating the contents of electronic value, and finally send to the browser 401 the data generated by the electronic value object indicating the electronic value contents. At this point, the data generated by the electronic value object and indicating the electronic value contents is written in a specific markup language.

As another example, when the user wishes to purchase another electronic value, the electronic wallet 400, in response to the request from the browser 401 for receiving the electronic value, will receive the electronic value sent from the electronic value server 103.

In response to the purchase order of electronic value by the browser 401 to the information server 102, the information server 102 will send a request for issuing an electronic value to the electronic value server 103, then obtain a session number valid for receiving an electronic value from the electronic value server 103, and send to the browser 401 the data that prompts the receiving operation of electronic value to the user. FIG. 26 shows an example of the data that is sent from the information server 102 to the browser 401 for prompting the receiving operation of electronic value. FIG. 10(g) shows a display screen on which the browser 401 displays the data.

When the user selects "Receive e-Value", then a tag <Go HREF="wallet:///evReceive"> will be executed so as to request the electronic wallet 400 by the browser 401 to receive a new electronic value. At this point, the URI of the electronic value server 103 (EV_ISSUER_URI="http://www.evalue.com") and the session number for receiving an electronic value (SESSION_NUM="a01b23c45d67e89f") will be sent from the browser 401 to the electronic wallet 400 as arguments to the tag.

The electronic wallet 400, which is requested to receive an electronic value by the browser 401, will access the electronic value server 103 (EV_ISSUER_URI="http://www.evalue.com") via the RF communication unit 305 to mutually authenticate with the electronic value server 103 to establish an encrypted session by using the user private key and the user certificate and the service provider certificate, all stored in the smart card 307. The electronic wallet 400 then will request the electronic value server 103 to issue an electronic value, and will receive data including an electronic value from the electronic value server 103. At his point, the issuing request sent from the electronic wallet to the electronic value server includes the session number indicating the electronic value to be received by the electronic wallet. The electronic wallet 400, which may have received the data including an electronic value, will generate an electronic value object from the received data and, in addition, request thus generated electronic value object to generate an electronic value data. The electronic value data generated by the electronic value object will be stored in the smart card 307 and the electronic value will be registered to the electronic wallet. Here, the electronic value data indicates serial data converted in a specific format from the electronic value object, and the conversion process to the serial data may permit encryption to be included.

In the case of settling the transaction of electronic value, the electronic wallet 400, in response to the request for settling the transaction of electronic value by the browser 401, will proceed to process the settlement of transaction with the service terminal 105 or the service server 106. Upon reception of the request of transaction settlement sent from the browser 401, if the browser 401 is in communication with the service server 106, the electronic wallet 400 will process the transaction with the service server 106 via the RF communication unit 305, on contrary if the browser 401 is not connected to the service server 106 then the electronic wallet 400 will process the transaction with the service terminal 105 via the IR communication module 211. The transaction settlement processing of the electronic value will be described in greater details later.

Figure 13:
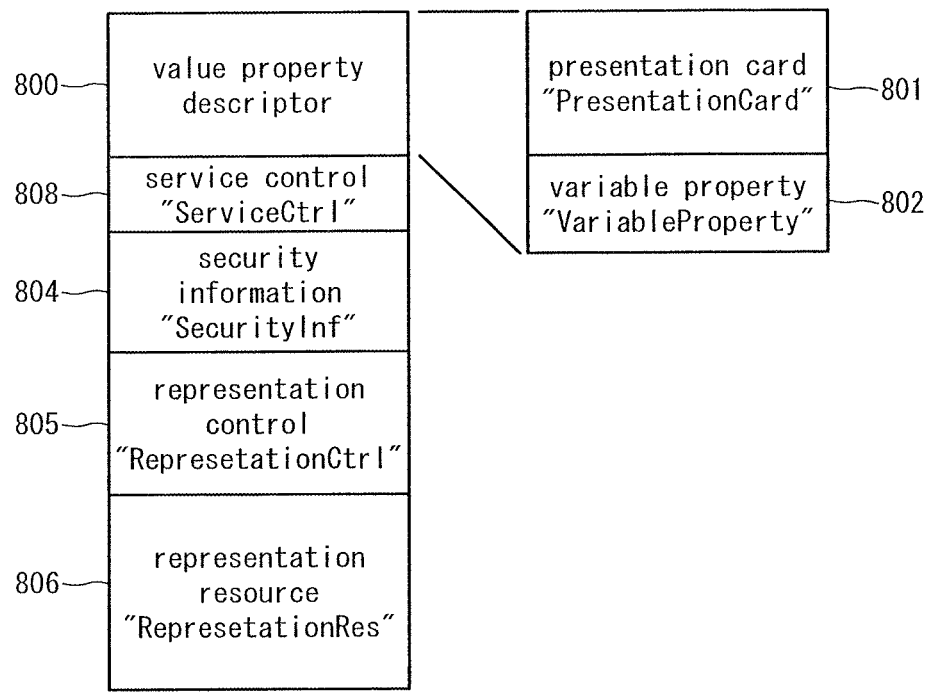
FIG. 13 is a schematic block diagram of the data structure of electronic value in accordance with the first embodiment of the invention.

Now the data structure of electronic value (electronic value data) to be stored in the smart card 307 will be described. Referring to FIG. 13, there is shown a schematic diagram indicating the data structure of electronic value. In FIG. 13, one electronic value is composed of five component segments, namely, a value property descriptor 800, a service control 803, a security information 804, a representation control 805, and a representation resource 806.

The value property descriptor 800 is a segment defining various property, such as the type of electronic value, code number, ID number, and the name. The value property descriptor 800 may further includes a presentation card 801 indicating invariable property that the value will not be changed by the transaction settlement processing, and a variable property 802 indicating variable property that the value will be updated by the transaction settlement processing. The service control 803 is a segment defining the contents of process performed on the electronic value at the time of transaction settlement. The security information 804 is a segment defining the security information such as encryption key of the electronic value and the like. The representation control 805 is a segment defining the display of electronic value. The representation resource 806 is a segment defining data such as image and audio data and the like, used for the display of electronic value and sound effect.

The data structure of electronic value is based on a specific markup language. The smart card 307 will store an encoded version of the specific markup language. Now referring to FIG. 17, there is shown a typical example of electronic value, written in a specific markup language, the drawing being partly omitted for the simplicity. The electronic value in this example is managed by the electronic wallet 400 under the identifier "ev00000033".

The presentation card 801 is digitally signed by the service provider (http://www.evalue.com), and the variable property 802 is the private key of that electronic value (evPrivateKey), in other words the electronic value itself. The service control 803, security information 804, representation control 805, and representation resource 806 are also digitally signed by the service provider (http://www.evalue.com). These digital signatures will be verified each time an electronic value object is generated, so that any unauthorized alteration to this part will be practically difficult. It should be noted that only URIs in the representation control 805 and the representation resource 806 are defined, the representation control 805 entity will be separately defined in the section 1201, the representation resource 806 entity in the section 1202, respectively. Also the service provider (http://www.evalue.com) will be defined in the section 1200.

Referring to FIG. 18, there is shown the presentation card 801 and the variable property 802 of the electronic value shown in FIG. 17, without omission. In FIG. 18, the electronic value may have, as the fixed properties, the electronic value type (evType) of "ticket", the code number (evCode) of 0000300000000201", the ID number (evID) of "1000000000000000000000000000001", the ticket title (TITLE) of "Soccer 200× Japan vs Brazil", the seat number (SEAT NUM) of ":SS-A-28", and so one, and as the variable properties, the validity flag (VALIDITY) to "1" (i.e., valid), the used flag (USED) to "0" (i.e., not yet used), the number of tickets (NUMBER) to "1" (i.e., one time ticket) and so on.

Now referring to FIG. 19, the service control 803 and the security information 804 of the electronic value shown in FIG. 17 is shown without omission. In FIG. 19, the electronic value has three service control modules defined, namely the ticket module ("ticket"), property verification module ("verify_prop"), and message setting module ("set_message"). The term "service control modules" means that the processing of transaction settlement is divided into small process blocks. In the transaction processing, the service control modules defined in the service control 803 will be executed. More specifically, changing the combination of service control modules defined in the service control 803 will allow a variety of transaction processing to be defined.

For instance, in that electronic value as have been described just above, the ticket module is a modular block of the basic function of ticket, which may decrement by "1" the available number of tickets ($NUMBER), set the start of the effective period ($START_VALID) and the end of the effective period ($END_VALID), flip the used flag ($USED) to "1" (i.e., already used), set the validity flag ($VALIDITY) in correspondence with the available period, and increment by "1" the serial number of use ($USE_SERIAL) indicating the number of use of the electronic value, or the number of times of settlement processing. The property verification module is a module for checking the property of the specified electronic value, which in this example will verify the seat number ($SEAT_NUM) according to the transaction processing. The message setting module is a module for setting a message (character string), which will set according to the transaction processing the message prepared in the service terminal 105 (or the service server 106) to one of variable properties, the message 2 ($MESSAGE_2). The process as have been described above will be performed within one transaction processing at the same time.

In the security information 804, the electronic value private key (evPrivateKey) of a public key encryption method used as the key specific to this electronic value, the electronic value certificate (evCertificate) corresponding to the key, and the electronic value authentication key (evAuthKey) and electronic value handler authentication key (evhandlerAuthKey) of a public key encryption method used as the keys specific to a unique code number of electronic values, and the like are defined. Here, an electronic value handler is the information predetermined for the transaction processing in the service terminal 105 or the service server 106, either of which performs the processing with this electronic value. In either the service terminal 105 or the service server 106, an electronic value handler object will be generated at the time of transaction processing, so that substantially the transaction settlement will be processed between the electronic value object and the electronic value handler object. The electronic value handler will be detailed later.

Referring to FIG. 20, there is shown the entity 1201 of the electronic value presentation control shown in FIG. 17, without omission. In FIG. 20, two types of display information, namely "Main" and "Detail" are defined in this electronic value. In the entity 1201 of the presentation control section, a template of display screen written in a specific markup language is defined. The electronic value object of this electronic value will substitute the code segment between <evP> and </evP> with the property value defined by the presentation card 801, and the code segment between <evV> and <levy> with the property value defined by the variable property 802 to generate data indicating the electronic value contents. For example, in the listing display of electronic values shown in FIG. 10(*e*), when the user selects "7: Soccer 200× Japa", the electronic value object will generate display information "Main" as shown in FIG. 22, and the browser 401 will display on the LCD 200 the display screen as shown in FIG. 10(*f*).

Referring to FIG. 21, there is shown the entity 1202 of electronic value presentation resource section of FIG. 17 in greater details. In FIG. 21, the electronic value has data of two images labeled as "MAIN_IMG" and "MAP", and an audio data labeled as "Greet" being defined.

For example, in case of the display information "Main" shown in FIG. 22, the line "<IMGSRC="wallet:///evResource label=MAIN_IMG">is a description defining the way how to display the image labelled as "MAIN_IMG" in the presentation resource section of the electronic value object, which object is present in the electronic wallet 400. In the resource data shown in FIG. 21, image data with "MAIN_IMG" label will be transferred to the browser 401 to be displayed as shown in FIG. 10(*f*).

As can be appreciated from the foregoing description, various properties in one electronic value, processing details of the transaction settlement, and the electronic value display may be defined on the basis of the specific markup language used.

It is to be appreciated by the one skilled in the art that the presentation control entity 1201 and the presentation resource entity 1202 of the electronic value may also be stored in the FeRAM 301, instead of storing the smart card 307. In such a case, the capacity per one electronic value to be stored in the smart card 307 may be significantly reduced to benefit the merit that much more electronic values can be stored in a smart card 307. Since the FeRAM 301 has much space in capacity as compared with the smart card 307, an electronic value having a presentation control entity 1201 and a presentation resource entity 1202 of large capacity size may be dealt with by the mobile user terminal 101. This implies that an electronic value defining a complex display such as electronic value using a script in the presentation control section, or an electronic value having a diversified expressive power such as an electronic value having multimedia information including a color image defined in the presentation resource section, may be used with the mobile user terminal 101.

However, in such a situation, when inserting the smart card 307 into the smart card reader/writer 701 of the user terminal 107 to display the electronic value contents on the screen of the computer 700, the presentation control entity 1201 and presentation resource entity 1202 of the presentation control section will be required. The electronic value contents can be displayed by downloading, based on the URI of these entities defined in the representation control 805 and the representation resource 806, the presentation control entity 1201 and the presentation resource entity 1201 via the Internet 100. Also in this situation, the presentation control entity 1201 and the presentation resource entity 1202 will be downloaded, which may fit to the type and the display size of the user terminal 107. This means that the electronic value displayed on the user terminal 107 is different from that intended to be displayed on the small display of a mobile user terminal 101, and may have a diversified expressive power suitable for the display size of the user terminal 107.

The mechanism of downloading the presentation control entity 1201 and presentation resource entity 1202 in accordance with the type of terminal will be described later.

Now the electronic value handler will be described. An electronic value handler may exist in correspondence with the code number of an electronic value, and is distributed via the Internet 100 in advance, to the service terminal 105 and the service server 106 of merchants dealing with that electronic value.

Figure 14:
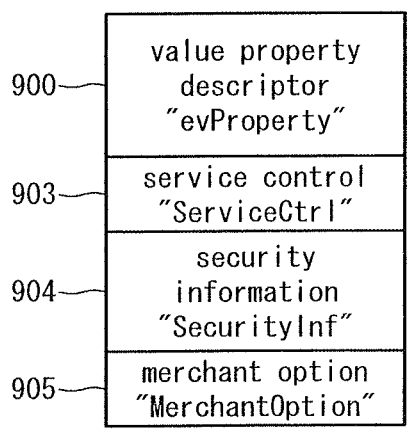
FIG. 14 is a schematic block diagram of the data structure of electronic value handler in accordance with the first embodiment of the invention.
Figure 15:
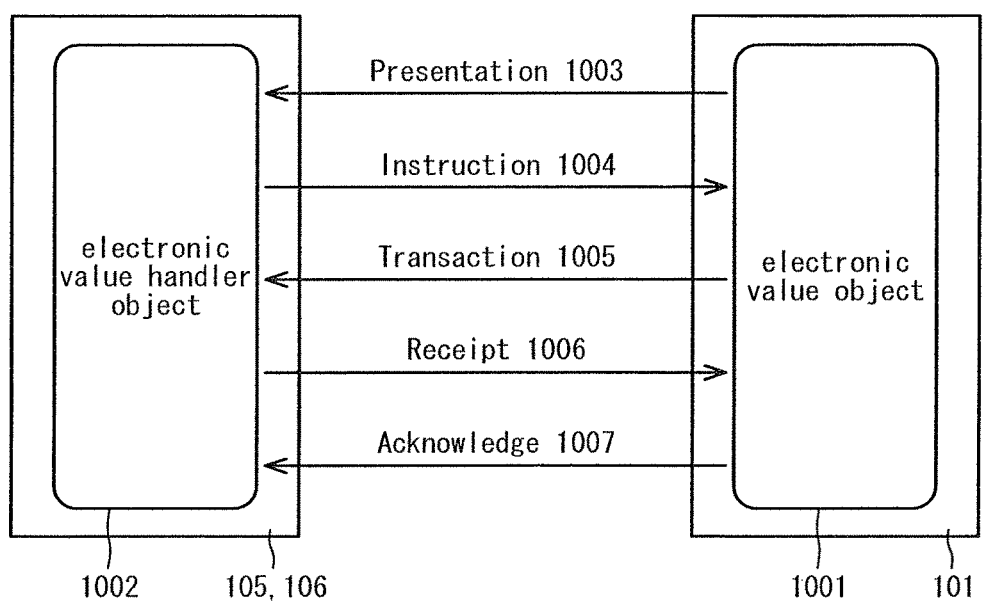
FIG. 15 is a schematic diagram of message exchange during the transaction settlement processing in accordance with the first embodiment of the invention.

Now referring to FIG. 14, there is shown the data structure of an electronic value handler. In FIG. 14, an electronic value handler is consisted of four sections, namely a value property descriptor 900, a service control 903, a security information 904, and a merchant option 905. The value property descriptor 900 is a section defining various properties, including the type of electronic values to be dealt with, code number, ID number, name and so on. The service control 903 is a section defining the processing contents of transaction settlement with the electronic value. The security information 904 is a section defining the security information, including the private key of the electronic value handler. The merchant option 905 is a section defining additional settings of specific merchants.

The data structure of electronic value handler is also based on a specific markup language, and the encoded version thereof will be stored in the service terminal 105 or service server 106.

Now referring to FIG. 23, there is shown coding of an electronic value handler corresponding to the electronic value shown in FIG. 17, written in a specific markup language, with some omission. The electronic value handler shown may be managed by the electronic merchant under the identifier "ev00000001. Of data consisting an electronic value handler, sections including the value property descriptor 900, the service control 903, and the security information 904 are distributed from the service provider, while the merchant option 905 is the additional section, which is appended by the merchant with a merchant application. The digital signature by the service provider (http://www.evalue.com) is therefore valid only in the value property descriptor 900, the service control 903, and the security information 904. The digital signature will be verified each time an electronic value handler object is created, so that any unauthorized alteration on these sections may be enough difficult.

In the value property descriptor 900 shown in FIG. 23, the electronic value to be dealt with may have properties that the type of electronic value (evType) is "ticket", the code number (evCode) is 0000300000000201", the title of ticket (TITLE) is "Soccer 200× Japan vs Brazil", and so on. However, the seat number (SEAT_NUM) and message 2 (MESSAGE_2) are not defined but an element "permission="public"" is added for each so as not to be left blank, indicating that the setting by the owner (merchant) of the electronic value handler is allowable. This allows the merchant option 905 to be added by a merchant. For example, in the merchant option 905 of FIG. 23, the seat number ($SEAT_NUM) has "SS-*-*", and the message 2 ($MESSAGE_2) has "Special News available: http://www.yis.co.jp/news/20020630".

The service control 903 in FIG. 23 may define the service modules each corresponding to the ticket module ("ticket"), property verification module ("verify_prop"), and message setting module ("set_message") of electronic value. The coding is in a markup language, similar to the electronic value, however a service module for performing the processing in the merchant side will be executed. For example, for the property verification module, the seat number ($SEAT_NUM) will be matched with "SS-*-*", in accordance with the setting in the merchant option 905. Here the asterisk (*) means any character strings, thus the tickets for the grade "SS" may be allowed for the transaction settlement. For the message setting module, a message telling "Special News available: http://www.yis.co.jp/news/20020630" will be put into the message 2 "$MESSAGE_2) of the electronic value, in accordance with the setting in the merchant option 905, at the time of transaction processing.

The security information 904 shown in FIG. 23 has the same electronic value authentication key (evAuthKey) and electronic value handler authentication key (evhandlerAuthKey) as that defined in the security information 804 of electronic value shown in FIG. 17. The electronic value and electronic value handler uses those electronic value authentication key (evAuthKey) and the electronic value handler authentication key (evhandlerAuthKey) to mutually authenticate each other at the time of transaction processing.

The security information 904 shown in FIG. 23 has the same electronic value authentication key (evAuthKey) and electronic value handler authentication key (evhandlerAuthKey) as that defined in the security information 804 of electronic value shown in FIG. 17. The electronic value and electronic value handler uses those electronic value authentication key (evAuthKey) and the electronic value handler authentication key (evhandlerAuthKey) to mutually authenticate each other at the time of transaction processing.

Now the transaction processing between the mobile user terminal 101 and the service terminal 105 will be described in greater details. The transaction processing may be commenced by the step of displaying the electronic value to be used by the user on the LCD 200, directing the IR port (IR communication module) toward the IR communication adapter 602 of a service terminal 105, and pressing the function key to be allocated to start the execution of transaction processing. For example, in case of "Main" screen display shown in FIG. 22, when pressing the function key assigned to execute the transaction processing, the tag <Go HREF="wallet:///evTransact"/> will be executed to request the transaction processing to an electronic value object in the electronic wallet 400. Now referring to FIG. 15, there is shown a message to be exchanged between the mobile user terminal 101 and the service terminal 105 during the transaction. At first, a message presentation ("Presentation") 1003 asking the transaction processing of electronic value will be sent from the electronic value object. In response thereto, the merchant application in the service terminal 105 will create an electronic value handler object that corresponds to the electronic value in question, that created electronic value handler object will send an instruction 1004, a message requesting the update of the property value to the electronic value. The electronic value object will update the property value in accordance with the instruction 1004, and then will send a transaction ("Transaction") 1005, a message confirming the update to the electronic value handler object. The electronic value handler object will verify the contents of the transaction 1005, and if it is correct then will send a receipt ("Receipt") 1006, corresponding to a receipt for the transaction 1005. Thereafter, the electronic value object will further verify the contents of the receipt 1006, and if it is correct then will send an acknowledgement ("Acknowledge") 1007, an acknowledgement message confirming the reception of the receipt 1006 to the electronic value handler object and store the electronic value data having the property value updated and the receipt into the smart card 307 to terminate the process. If there is occurred an error during the transaction, the one having the error will send an error message to the other side to abort the process.

The presentation 1003 may consist of, as shown in FIG. 16(a), a message header 1110, a request number 1111 that is unique to a process from the viewpoint of electronic wallet 400, a presentation card 1012 (801) of the electronic value, and a service control message 1113 of the service control module. All these components are digitally signed by the electronic value signature 1114 using the electronic value private key. Then after an electronic value certificate 1115 will be appended thereto, encryption of the entity will be done by using the electronic value handler authentication key. And finally a message header 1117 and a code number 1118 of the electronic value will be appended thereto.

The merchant application in the service terminal 105 will, on the basis of the code number 1118 of the presentation 1003, generate an electronic value handler object corresponding to the electronic value. Thus generated electronic value handler object will decrypt the section 1116 encrypted by the electronic value handler authentication key, verify the electronic value certificate 1115 and electronic value signature 1114, then verify the service control message 1113. If the presentation 1003 is correctly verified, the electronic value handler object will create an instruction 1004 to be sent.

The instruction 1004 is consisted of, as shown in FIG. 16(b), a message header 1120, a request number 1121 (1111) that was included in the presentation 1003, a transaction settling number 1112 that is unique to a transaction from the point of view of the merchant application, a service control message 1123 by the service control module. After digitally signing by the merchant with the merchant private key 1124, appending thereto a merchant certificate 1825 and a session key "A" 1126 that has been newly generated, and encrypting all the components above by the electronic value authentication key, a message header 1128 will be added thereto. The electronic value object will decrypt the section 1127 encrypted by the electronic value authentication key, verify the electronic merchant certificate 1125 and the merchant's signature 1124, then check the request number 1111 to detect the service control message 1113. If and only if the instruction 1004 correctly passes the verification, the electronic value handler object is judged to be an authenticated electronic value handler object having a correct electronic value authentication key and correct electronic value handler authentication key. The electronic value object will then update the property value based on the instruction 1004 to generate and send a transaction 1005.

The transaction 1005 is consisted of, as shown in FIG. 16(c), a message header 1130, a request number 1131, a transaction number 1132 (1122) that was included in the instruction 1004, a merchant ID 1133 corresponding to the destination of the transaction 1005, and a service control message 1134 by the service control module. After digitally signing by the electronic value private key 1135 all those sections, adding thereto a session key "B" 1136 that has been newly generated, then encrypting all with the session key A 1126 included in the instruction 1004, a message header 1138 will be further appended thereto.

The electronic value handler object will decrypt the section 1137 encrypted by the session key "A" 1126, verify the electronic value signature 1135, check the request number 1111 and the transaction number 1132, and finally verify the service control message 1113. If and only if the transaction 1005 has been correctly verified, the electronic value object is judged to be the authenticated one having a correct electronic value authentication key and a correct electronic value handler authentication key. The electronic value handler object will thereafter generate a receipt 1006 corresponding to the receipt of the transaction 1005 and send it.

Figure 16:
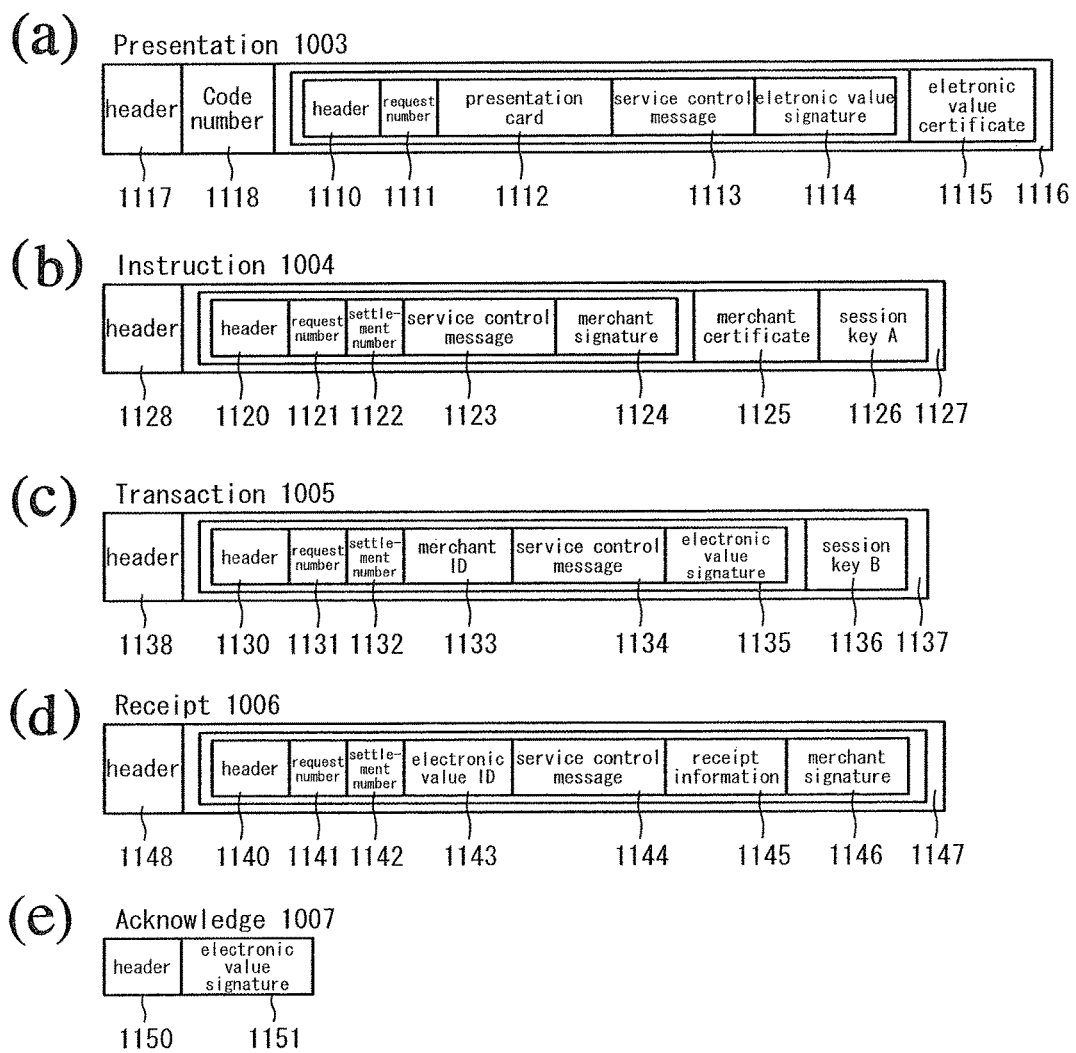
FIG. 16(*a*) is a schematic diagram of the data structure of message presentation for the transaction settlement processing in accordance with the first embodiment of the invention, (*b*) is a schematic diagram of the data structure of message instruction for the transaction settlement processing in accordance with the first embodiment of the invention, (*c*) is a schematic diagram of message transaction for the transaction settlement processing in accordance with the first embodiment of the invention, (*d*) is a schematic diagram of data structure of message receipt for the transaction processing in accordance with the first embodiment of the invention, and (*e*) is a schematic diagram of the data structure of message acknowledge for the transaction settlement processing in accordance with the first embodiment of the invention.

The receipt 1006 is consisted of, as shown in FIG. 16(*d*), a message header 1140, a request number 1141 (1131), a transaction number 1142 (1132), an electronic value ID 1143 that corresponds to the destination of the receipt 1006, a service control message 1144 by the service control module, a receipt information 1145. After digitally signing 1146 all those components above by the merchant private key, encrypting them with the session key "B" 1136 included in the transaction 1005, a message header 1148 will be appended thereto.

The electronic value object will decrypt the section 1147 that has been encrypted by the session key "B" 1136, verify the merchant signature 1146, check the request number 1111 and the transaction number 1132 to detect the service control message 1113. If the receipt 1006 is correctly verified, the electronic value object will be determined to be the authentic one having a correct electronic value authentication key and a correct electronic value handler authentication key. Thereafter the electronic value handler object will create and transmit an acknowledge 1007 corresponding to the acknowledgement of the receipt 1006.

The acknowledge 1007 is consisted of, as shown in FIG. 16(*e*), a message header 1150, with the electronic value signature 1151 by the electronic value private key for the receipt 1006 being added thereto.

The electronic value handler object will verify the electronic value signature 1151 and store the decrypted transaction and receipt if the signature is correct, to terminate the transaction processing.

The electronic value object, having sent the acknowledge 1007, will store the electronic value data with the property value updated and the decrypted receipt into the smart card 307 to terminate the processing. At this point the variable property 802 of the electronic value will be again digitally signed by the electronic value private key.

In the transaction processing, the service control message set in each of the presentation 1003, the instruction 1004, the transaction 1005, and the receipt 1006 will coerce the transaction settlement specific to each electronic value. The service control message may be set by the service control module and may be verified by the service control module of the other party.

In the presentation 1003, the instruction 1004, the transaction 1005, and the receipt 1006 the data shown in FIG. 24(*a*), (*b*), (*c*) and (*d*) respectively will be set as the service control message after encoding. For example, in case of FIG. 24(*a*), current properties of the electronic ticket will be presented, such as "number=1 start="1999.07.23T00:00+0900" end="2002.06.30T23:59+0900" used_flag=0 validity_flag=1 serial=0" for the service control module (ticket module) with ID "1" of the electronic value handler object, "prop=SS-A-28" for the service control module (property verification module) with ID "2", "msg=" for the service control module (message setting module) with ID "3", and will be checked at respective service control modules of the electronic value handler object. For example, if the electronic value handler is as shown in FIG. 23 and the data is "prop=S-A-28", then a verification error will occur.

In case of FIG. 24(*b*), property update instruction will be presented, such as "number=0 start="2002.06.30T12:25+0900" end="2002.06.30T23:59+0900" used_flag=1 validity_flag=1 serial=1" for the service control module (ticket module) with ID "1" of the electronic value handler object, and "msg="Special News available: http://www.yis.co.jp/news/20020630" for the service control module (message setting module) with ID "3", and the properties of the appropriate service control modules in the electronic value object will be updated.

In case of FIG. 24(*c*), properties of the electronic ticket after the update will be presented, such as "number=0 start="2002.06.30T12:25+0900" end="2002.06.30T23:59:+0900" used_flag=1 validity_flag=1 serial=1" for the service control module (ticket module) with ID "1" of the electronic value handler object, "prop=SS-A-28" for the service control module (property verification module) with ID "2", "msg="Special News available: http://www.yis.co.jp/news/20020630" for the service control module (message setting module) with ID "3", and will be checked at respective service control modules of the electronic value handler object.

In case of FIG. 24(*d*), the serial number used of the transaction 1005 will be presented such as "serial=1" for the service control module (ticket module) of the electronic value object with ID "1", and will be checked at the ticket module of the electronic value object.

As the result of transaction processing as have been described above, for example, the variable property for the electronic value shown in FIG. 17 will be as shown in FIG. 25. In this case, in particular, the MESSAGE_2 includes a message set by the merchant as "special News available: http://www.yis.co.jp/news/20020630" will be set as the result of the complete transaction processing, to be displayed in the "Detail" display of the electronic value on the LCD 200.

The transaction processing between the mobile user terminal 101 and the service server 106 may be performed in a similar procedure to the processing between the mobile user terminal 101 and the service terminal 105, except for the fact that digital wireless communication is used instead of the IR communication. The transaction processing between the user terminal 107 and the service server 106 also will be performed in a similar procedure to the processing between the mobile user terminal 101 and the service terminal 105, through the communication channel 115, the Internet 100, and the digital communication line 114.

As can be seen from the foregoing description, by combining the mobile user terminal 101 and service terminal 105, and the electronic value and the electronic value handler in a manner as described above, a various types of transaction, i.e., a variety of electronic values may be defined, with a higher level of security being ensured, allowing miscellaneous configuration in the disposal operation by merchants to be maintained to a certain extent.

Next, the electronic value server 103 and the procedure of issuing an electronic value will be described in greater details.

Figure 27:
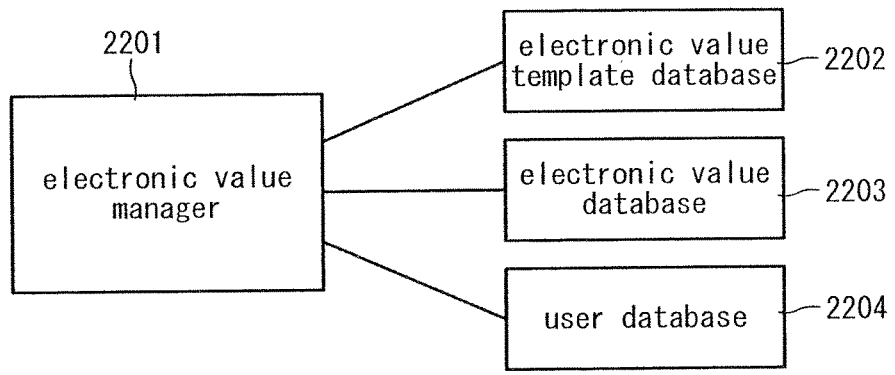
FIG. 27 is a schematic block diagram of an electronic value server in accordance with the first embodiment of the invention.

Now referring to FIG. 27, there is shown a schematic block diagram of an electronic value server 103. In FIG. 27, the electronic value server 103 may have an electronic value template database 2202 for managing the electronic value template data, which is the source data of the electronic values to be issued, an electronic value database 2203 for managing the generated electronic values, a user database 2204 for managing users of the mobile electronic commerce service, and an electronic value manager 2201 for communicating with the electronic value template database 2202, the electronic value database 2203, and the user database 2204 to generate electronic values.

The electronic value template database 2202 may manage the electronic value templates for each electronic value code (evCode), which indicates the type of electronic value. Now referring to FIG. 28, there is shown a schematic structure of one electronic value template data 2300 managed under the electronic value template database 2202.

Figure 28:
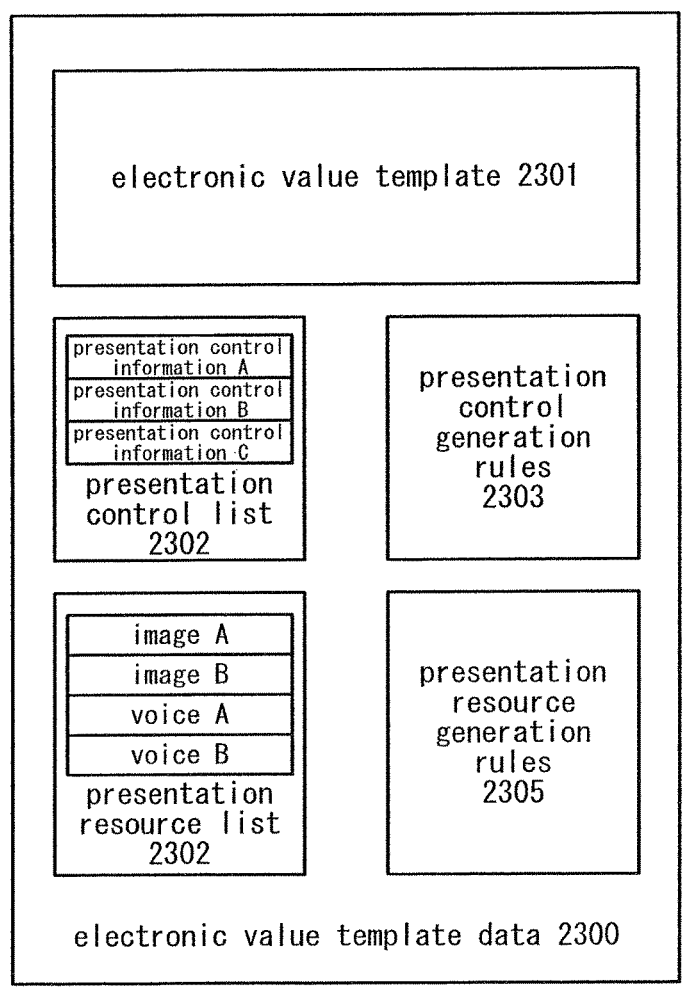
FIG. 28 is a schematic block diagram of an electronic value template data 2300 under the control of an electronic value template database in accordance with the first embodiment of the invention.

In FIG. 28, the electronic value template data 2300 is consisted of an electronic value template 2301, a presentation control list 2302, a presentation control generation rules 2303, a presentation resource list 2304, and a presentation resource generation rules 2305. The electronic value template 2301 is a template of electronic values to be issues and is written in a specific markup language. The presentation control list 2302 is a list of presentation control information, written in a specific markup language applicable to the electronic values to be issues. The presentation control generation rules 2303 is a program script for selecting a presentation control section most suitable to a mobile user terminal (or a user terminal) from within the presentation control list 2302 in order to generate the presentation control section of electronic value. The presentation resource list 2304 is a list of image data and audio data that can be applied to the electronic values to be issued. The presentation resource generation rules 2305 is a program script for selecting image data and/or audio data appropriate for the mobile user terminal (or the user terminal) from within the presentation resource list 2304 to generate the presentation resource section of the electronic value. The presentation control list 2302 may include various presentation control information corresponding to various models of mobile user terminal (or user terminal). The presentation resource list 2304 may include a series of same image data in different resolutions, different number of colors, and different data formats, for the compatibility with various models of mobile user terminal (or user terminal), and a series of same audio data in different sampling frequency, and different data format.

When the electronic value template data 2300 is formed in this manner, the electronic value server 103 may issue an electronic value compatible and according to the type of mobile user terminal (or user terminal)

Now referring to FIG. 29(*a*), there is shown the procedure of issuing an electronic value.

In response to the purchase order of an electronic value (2401), placed from the mobile user terminal 101 (browser 401) to the information server 102, an electronic value issuing request (2402) will be sent from the information server 102 to the electronic value server 103. Now referring to FIG. 30(*a*), which shows a typical example of electronic value issuing request (2402). In the electronic value issuing request (2402) any necessary information for determining the electronic value to be issued such as the type of electronic value (evType) and the code of electronic value (evCode). For example, in case of the electronic value issuing request (2402) shown in FIG. 30(*a*), an electronic value is requested to be issued, in that the electronic value type (evType) is "ticket", electronic value code (evCode) is "0000300000000201", the seat number in the electronic value property information (SEAT_NUM) is "SS-A-28", the seat position (SEAT POS) is http://www.mts.com/ticket123/seat/SS-A-28".

The electronic value server 103, after having received an electronic value issuing request (2402), will attempt to send the session number (2403) to the information server 102 in order for the user to receive the electronic value requested, if the electronic value requested can be issued. The information server 102 after having received the session number (2403), will send to the mobile user terminal 101 (browser 401) the display data for operation upon receiving the electronic value (2404), in order to prompt the user to operate the terminal to receive the electronic value. The mobile user terminal 101 (browser 401) after having received the display data for electronic value reception (2404) will display a display screen as shown in FIG. 10(*g*).

Now referring to FIG. 26, there is shown a typical example of the display data for electronic value reception (2404). The display data for the electronic value reception (2404) may include a session number for the user to receive an electronic value from the electronic value server 103.

Next, when the user selects "Receive e-Value" menu item, the mobile user terminal 101 (browser 401) will execute the corresponding tag <Go HREF="wallet:///evReceive">. The mobile user terminal 101 (electronic wallet 400) will access the electronic value server 103 and use the user private key, the user certificate and the service provider certificate, all stored in the smart card 307, to mutually authenticate each other with the electronic value server 103 to establish an encrypted session. After session established, the terminal will request the electronic value server 103 to issue an electronic value (2405) by using the session number as parameter for receiving the electronic value.

The electronic value server 103 after having received an issue request (2405) from the mobile user terminal 101 will transmit the terminal profile request (2406), a message requesting the terminal profile, which indicates properties such as the model and the display size of the mobile user terminal 101. The mobile user terminal 101 upon reception of the terminal profile request (2406) in turn will reply to the electronic value server 103 with its terminal profile (2407).

Now referring to FIG. 30(*b*), which shows a typical example of a terminal profile (2407) to be sent from a mobile user terminal 101 to an electronic value server 103. In this example, the profile states that the model type of terminal (TerminalType) is "MT0001", the type of browser application (BrowserType) is "B0001320A", the type of electronic wallet application (eWalletType) is "W000A10B", the screen size (Screen) is 160-by-200 pixels 8-bit color (160× 200×8).

Figure 31:
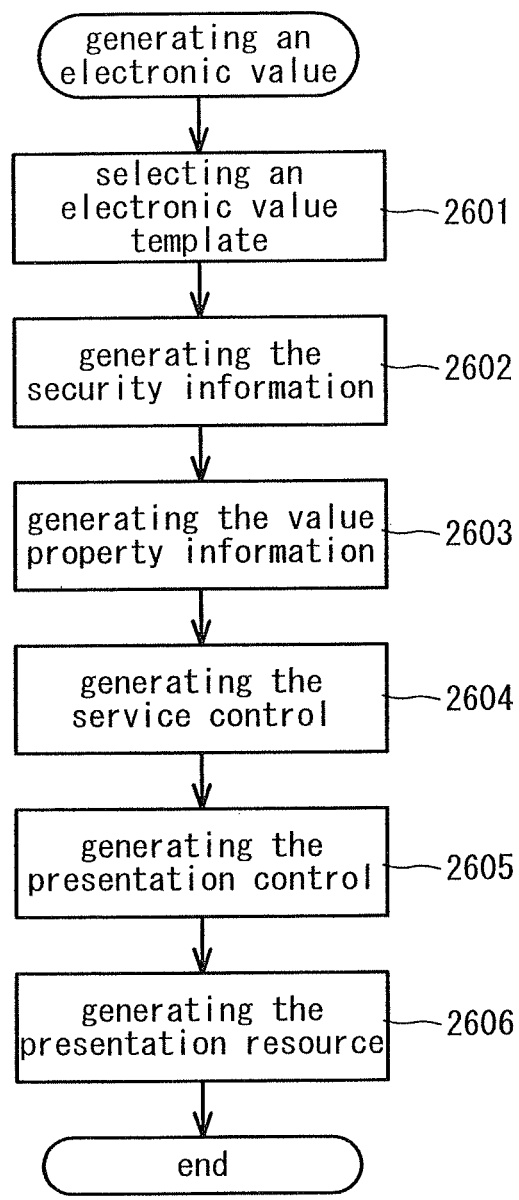
FIG. 31 is a flow chart of electronic value generation process by an electronic value server in accordance with the first embodiment of the invention.

In the electronic value server 103 having received a terminal profile (2407), the electronic value manager 2201 will generate an electronic value corresponding to the type of the mobile user terminal 101 based on the received terminal profile (2407). FIG. 31 shows the flow of generating an electronic value.

In FIG. 31, the electronic value manager 2201 will access the electronic value template database 2202 to select an electronic value template data 2300 (selecting an electronic value template 2601) indicated by the electronic value type (evType) and electronic value code (evCode) in the electronic value issuing request (2402).

Next, the electronic value manager 2201 will access the user database 2204 to retrieve the user information concerning the owner of the mobile user terminal 101, and will generate an electronic value ID (evID), an electronic value private key (evPrivateKey) unique to the electronic value, and an electronic value certificate (evCertificate) for the key to generate the security information 804 of the electronic value in combination with the electronic value template 2301 of the electronic value template data 2300 selected (generating the security information 2602).

Thereafter, based on the electronic value issuing request (2402), the electronic value manager 2201 will generate the presentation card 801 and the variable property 802 of the electronic value from the electronic value template 2301 (generating the value property information 2603). At this point the presentation card 801 will be signed by the signature of the service provider, while the variable property 802 will be signed by the electronic value private key (evPrivateKey).

Then, based on the electronic value issuing request (2402), the electronic value manager 2201 will generate the service control of the electronic value from the electronic value template 2301 (generating the service control 2604).

Next, the electronic value manager 2201 will execute the program script of the presentation control generation rules 2303 to select a presentation control information appropriate for the received terminal profile (2407) from the presentation control list 2302, add the electronic value Id (evID) to the selected presentation control information, digitally sign with the signature of service provider and finally generate the presentation control entity 1201 of the electronic value (generating the presentation control 2605).

After that the electronic value manager 2201 will execute the program script for the presentation resource generation rules 2305 to select image data and/or audio data appropriate for the received terminal profile (2407) from the presentation resource list 2304, and convert thus selected image and/or audio data into the descriptive style compatible with the presentation resource to generate the display resource entity 1202 of the electronic value (generating the presentation resource 2606), and then will terminate the process. If there is no image and/or audio data suitable for the terminal profile (2407) in the presentation resource list 2304, the electronic value manger 2201 may alternatively generate image and/or audio data appropriate for the terminal profile (2407) based on the data in the presentation resource list 2304.

The electronic value manager 2201 of the electronic value server 103 will then register thus generated electronic value into the electronic value database 2203 and transmit it to the mobile user terminal 101 (step 2408). Now referring to FIG. 32, there is shown the data structure of the electronic value written in a specific markup language and registered in the electronic value database 2203, corresponding to the electronic value shown in FIG. 17. This data structure is almost same to the electronic value stored in the smart card 307 in the mobile user terminal 101 as shown in FIG. 17, except for the part at the beginning of markup language description, "<Description about="http://www.evalue.com/evalue 1000000000000000000000000000000">". This indicates that the electronic value shown in FIG. 32 is managed in the electronic value database 2203 under the identifier http://www.evalue.com/evalue/1000000000000000000000000000001.

The mobile user terminal 101 having received the new electronic value, will generate the electronic value data, store it in the smart card 307, and register the electronic value to the electronic wallet 400. The electronic value at this time will be updated such that the first line description will be "<Description about="wallet:///Evalue/ev00000033">", as is shown in FIG. 17.

By combining the electronic value server 103, mobile user terminal 101, and the data structure of electronic value as have been described above, an electronic value suitable to the type of mobile user terminal 101 may be issued.

In cases in which the smart card 307 storing electronic values are connected to a mobile user terminal of another type having different display screen size in order to use an electronic value, or the smart card 307 storing electronic values is inserted into a smart card reader/writer 701 on the user terminal 107 in order to use an electronic value at the user terminal 107, for example, the presentation control entity 1201 and the presentation resource entity 1202 compatible with that terminal will be downloaded thereto to display electronic values in the style most suitable for that terminal. Now referring to FIG. 29(*b*), which depicts the downloading procedure of the presentation control entity 1201 and the presentation resource entity 1202 in such a case.

At first, the mobile user terminal 101 (or the user terminal 107) will request for the presentation control section entity (request for presentation control 2411) on the basis of the URI of the entity of the presentation control section, defined by the representation control 805 in the electronic value (e.g., "http://www.evalue.com/evalue/ev_0000300000000201/RpCtrl", in case of the electronic value shown in FIG. 17). In response to the request for presentation control 2411, the electronic value server 103 (URL=http://www.evalue.com) will reply to the mobile user terminal 101 a terminal profile request 2412, which is a message requesting the terminal profile that indicates the properties including the type, model screen size and the like of the mobile user terminal 101 (or user terminal 107). The mobile user terminal 101 (or user terminal 107) having received the terminal profile request 2406 will reply to the electronic value server 103 the terminal profile (2413). The electronic value server 103 having received the terminal profile 2413 will follow the similar procedure to generating the presentation control 2605 in the case of creating an electronic value, in order to generate a presentation control suitable for the mobile user terminal 101 (or user terminal 107) and transmit thus generated presentation control section (2414) to the mobile user terminal 101 (or user terminal 107).

Then, the mobile user terminal 101 (or user terminal 107) will request for the entity of presentation resource (presentation resource request 2415) on the basis of the URI of the entity of the presentation resource section, defined by the representation resource 806 in the electronic value (e.g., "http://www.evalue.com/evalue/ev_0000300000000201/RpRes" in case of the electronic value shown in FIG. 17). In reply to the request for the presentation resource request 2415, the electronic value server 103 (URL=http://www.evalue.com) will follow the similar procedure to generating the presentation resource 2606 in the case of creating an electronic value, in order to generate a presentation resource suitable for the mobile user terminal 101 (or user terminal 107) and transmit thus generated presentation resource section (2416) to the mobile user terminal 101 (or user terminal 107).

The mobile user terminal 101 (or user terminal 107) will use the presentation control (entity) and presentation resource (entity) downloaded from the electronic value server 103 and the electronic value data stored in the smart card 307 for generating an electronic value object to be displayed on the display screen in a most suitable arrangement.

At this point, only the portion concerning the presentation of electronic value will be modified in accordance with the type of the mobile user terminal 101 (or user terminal 107). This indicates that any improper use or abuse of this facility may not alter the presentation card 801, variable property 802, service control 803, and security information 804 of the electronic value in an unauthorized manner.

As can be appreciated from the foregoing description, by combining the electronic value server 103, mobile user terminal 101, user terminal 107 and the data structure of electronic value in a manner as have been described above, the security against any unauthorized attempt to alter the electronic value may be ensured while at the same time a variety of electronic values in a large expressive power may be processed, in correspondence with the terminal profile of the terminal that presents electronic values (for example, mobile user terminal 101 and user terminal 107). This will allow not only a colorful electronic value to be presented and processed, but also electronic values to be used as a sort of PR media. In the latter case, a variety of applications may be devised such as discount sale of electronic values to the appropriate user by rebating the user a part of advertisement income of the service provider, or distribution of electronic values to the users as reward of contest, and this system may encourage the use of mobile electronic commerce service.

It should be understood by those skilled in the art that in the above system, IR communication is used as means of communication between the mobile user terminal 101 and the service terminal 105, any other wireless communications may be used. In such a case the mobile user terminal 101 may have a wireless communication means according to the wireless communication system to be used, instead of the digital communication channel 111, and the service terminal 105 may have a wireless communication means according to the wireless communication system to be used, instead of the IR communication adapter 602.

In the foregoing description, a mobile user terminal 101 of the mobile electronic commerce system may comprise the most suitable hardware set in order to achieve facilities used in the mobile electronic commerce service. However these facilities may be effectuated by providing a computer, which include a digital wireless communication, IR communication, a smart card reader/writer, a display, a keyboard (or touch-pen input device and the like), a microphone, and a speaker. In such a case the program stored in the FeRAM 301 may be converted to a software program executable on the OS (operating system) used in the computer and stored in somewhere the computer may find and execute it (e.g., on a hard disk drive).

Second Embodiment

This embodiment of the invention has been devised for arranging the mobile user terminal 101 and the service terminal 105 in order to substantialize more stable transaction processing between a mobile user terminal and service terminal in the mobile electronic commerce system in accordance with the first embodiment described above, with no harm in the user operability.

Figure 34:
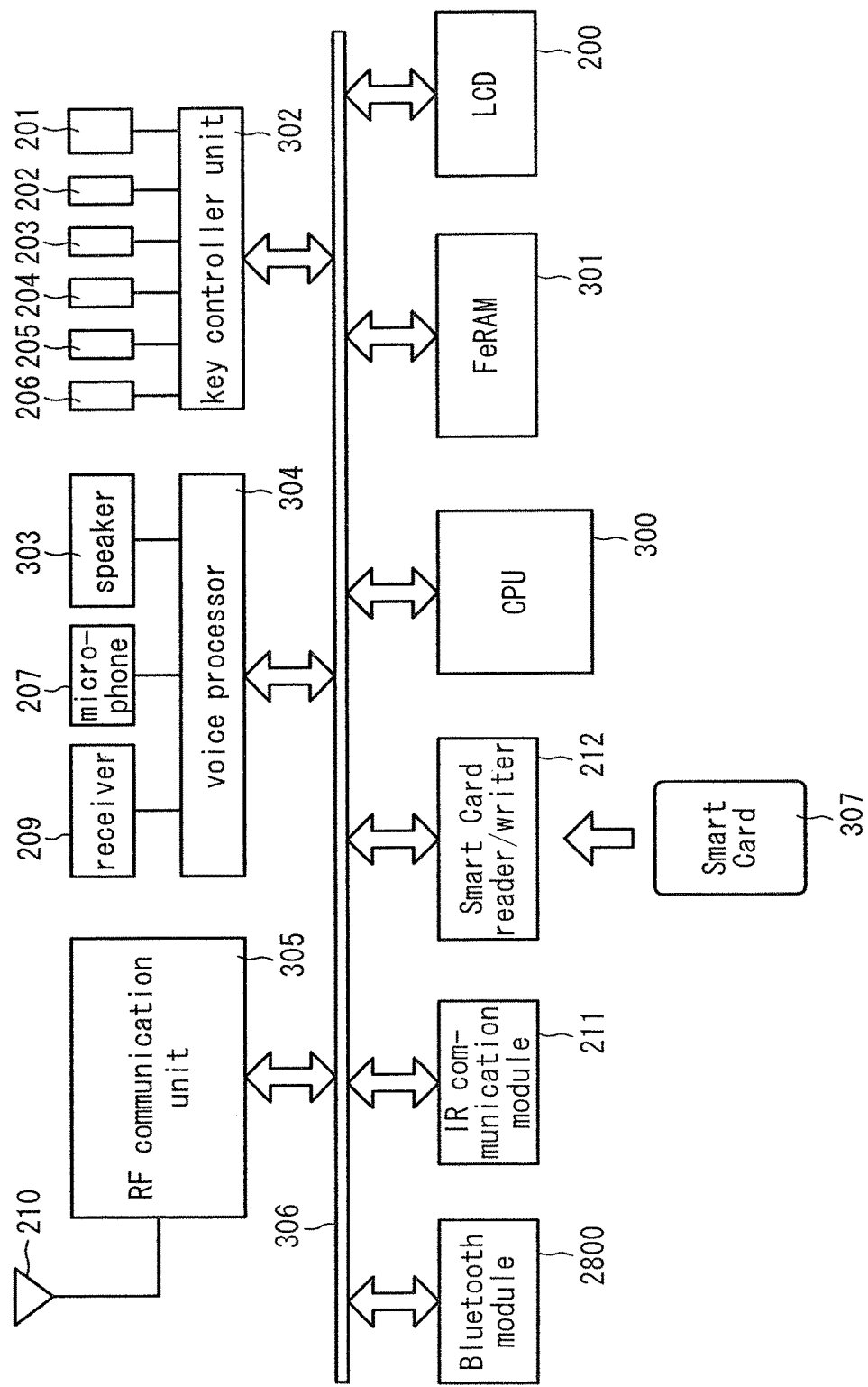
FIG. 34 is a schematic block diagram of a mobile user terminal in accordance with the second embodiment of the invention.
Figure 35:
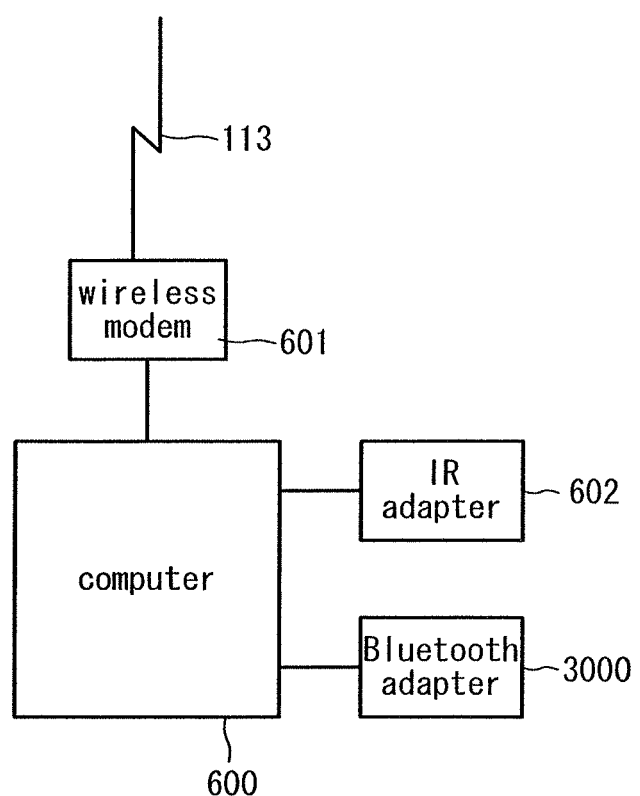
FIG. 35 is a schematic block diagram of a service terminal in accordance with the second embodiment of the invention.
Figure 37:
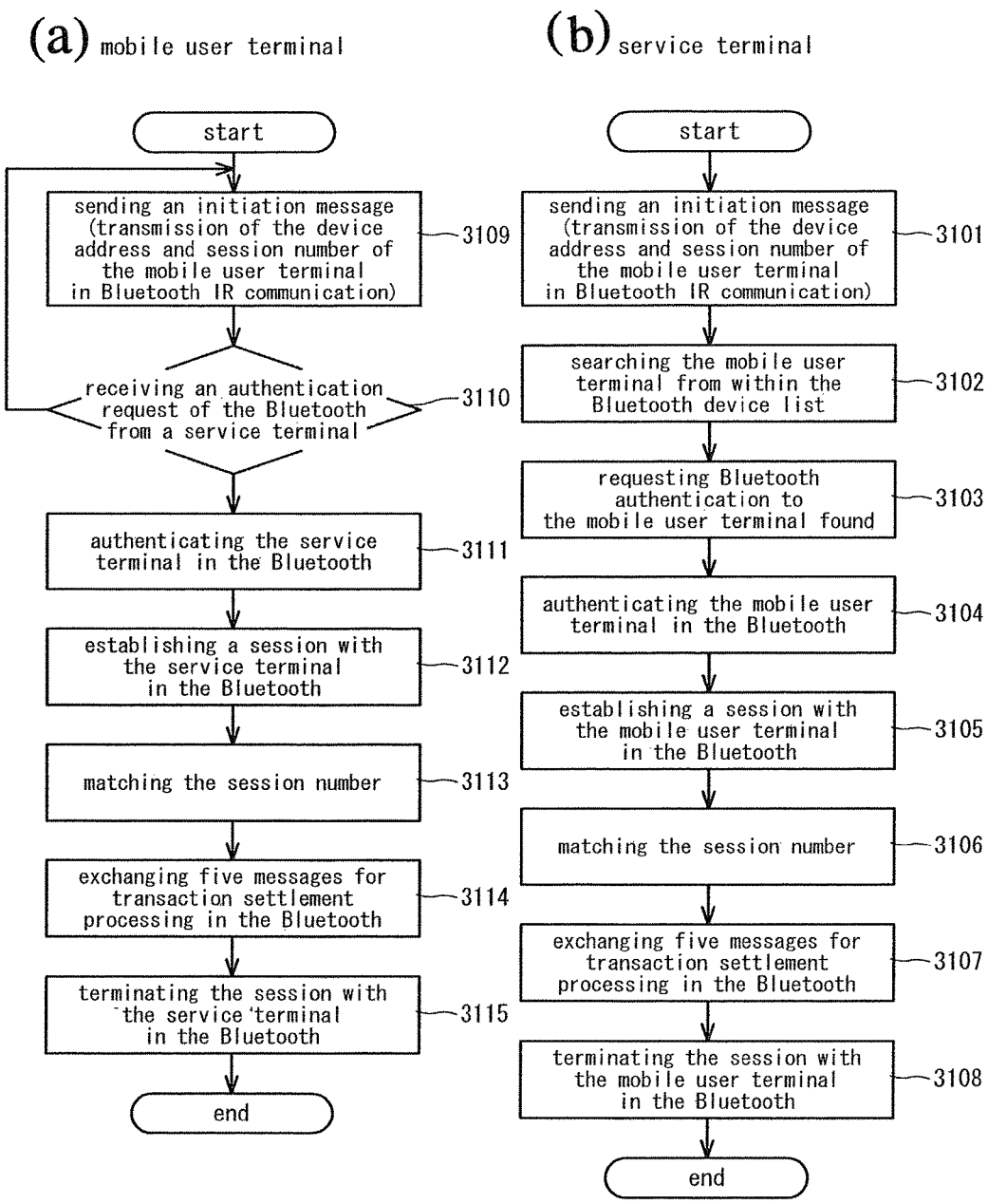
FIG. 37(a) is a flow chart of the transaction settlement processing in a mobile user terminal in case of pattern 2 in accordance with the second embodiment of the invention, and (b) is a flow chart of the transaction settlement processing in a service terminal in case of pattern 2 in accordance with second embodiment of the invention.

The mobile user terminal 101 in accordance with the present embodiment may have, as shown in FIG. 33(a) and (b), and FIG. 34, an IR communication port 211 (IR module) as well as a Bluetooth communication module 2800. The service terminal 105 on the other hand may have, as shown in FIG. 35, An IR communication adapter 602 and a Bluetooth communication adapter 3000. Both the mobile user terminal 101 and the service terminal 105 may use both communication means of IR and Bluetooth for the transaction processing.

In operation, the user will direct the IR port (IR communication module) 211 of the mobile user terminal 101 toward the IR communication adapter 602 of the service terminal 105 to have the transaction process, as was described in the preceding embodiment, and simply perform the starting operation of the transaction process (i.e., press the function key assigned for running the process). At this time, the mobile user terminal 101 and the service terminal 105 will cooperate to process the transaction settlement on the basis of procedure as will be described below.

Between the mobile user terminal 101 and the service terminal 105 to which the IR communication port 211 is pointed, IR communication will be started for exchanging any necessary information for commencing Bluetooth communication (including the device address, session number, and the like). Then, based on the information exchanged by IR communication (device address session number), a Bluetooth communication session will be established between the mobile user terminal 101 and the service terminal 105. Thereafter, five messages as described in the preceding embodiment, including the presentation 1003, instruction 1004, transaction 1005, receipt 1006, and acknowledge 1007 will be transacted by Bluetooth prior to terminate the processing.

As can be seen from the above description, as the preliminary stage prior to start Bluetooth communication, an IR communication with a narrower directivity shape may be used for exchanging any necessary information for starting Bluetooth communication (including the device address and session number). The Bluetooth communication may be selectively started with the selected other party, even when the other party is unspecific, by an intuitive and simple operation of directing the IR port to the receiver. With respect to the procedure before the Bluetooth communication session has been established a number of patterns of embodiments may be achievable. In the following discussion two typical exemplary procedures will be described.

[First Exemplary Procedure Pattern]

Now referring to FIG. 36(a) and (b), which shows respectively the procedures performed in the mobile user terminal 101 and the service terminal 105 in case of this first pattern.

In this procedure, the service terminal 105 continues to transmit through IR communication, the Initiation message, a message indicating the communication procedure with the service terminal 105 (procedure step 3109) until a user will operate his/her mobile user terminal to start the transaction and the service terminal 105 will receive the authentication request (procedure step 3110).

Here, the Initiation message includes the device address of the service terminal 105 in the Bluetooth environment, and a session number for identifying the Bluetooth communication session that is arbitrary configured by the service terminal.

The mobile user terminal 101 on the other hand, will receive the initiation message from the service terminal 105 via the iR communication port (IR module) 211 when the user operates the start operation of transaction (procedure step 3101). Then the mobile user terminal 101 will locate the service terminal 105 from the Bluetooth device list, based on the Bluetooth device address of the service terminal included in the initiation message (procedure step 3102) and request for the authentication in Bluetooth to the service terminal 105 (procedure step 3103).

Then, the mobile user terminal 101 and the service terminal 105 will mutually authenticate each other on the basis of the Bluetooth authentication procedure in respective procedure steps 3104 and 3111, and will establish a Bluetooth session in their respective procedure steps 3105 and 3112.

Next, the mobile user terminal 101 and the service terminal 105 will check the session number in their respective procedure steps 3106 and 3113. More specifically, the mobile user terminal 101 will send via Bluetooth to the service terminal 105 the session number included in the initiation message. The service terminal 105, on the other hand, will check a match between the received session number with the session number that the terminal has transmitted as part of the initiation message to distinguish the Bluetooth session.

Then, the mobile user terminal 101 and the service terminal 105 will exchange, in their respective procedure steps 3107 and 3114, a series of five messages, i.e., a Bluetooth presentation 1003, instruction 1004, transaction 1005, receipt 1006 and acknowledge 1007. In procedure steps 3108 and 3115, the Bluetooth session will be terminated to complete the transaction.

The mobile user terminal 101 may display an error message on the display a21-00 explaining the error details and abort the transaction, when a corresponding service terminal 105 is not found in the Bluetooth device list in the procedure step 3102; an error has been occurred during the Bluetooth authentication in the procedure step 3104; an error has been occurred during the Bluetooth session number check in the procedure step 3106; or an error has been occurred during exchange of five messages in the procedure step 3107.

The service terminal 105 will abort the processing when an error has been occurred during the Bluetooth authentication in the procedure step 3111; when an error has been occurred during the session number check in the procedure step 3113; or when an error has been occurred during exchange of five messages in the procedure step 3114.

In the above example, although the mobile user terminal 101 may receive the initiation message from the service terminal 105 through the IR communication in procedure step 3101, initiation messages may alternatively by exchanged mutually therebetween by sending an initiation message from the mobile user terminal 101 to the service terminal 105 through the IR communication. In this case, the initiation message transmitted from the mobile user terminal 101 to the service terminal 105 may include the Bluetooth device address of the mobile user terminal 101 and the session number identifying the Bluetooth session that is arbitrary configured by the mobile user terminal 101. The mobile user terminal 101 and the service terminal 105 may check their arbitrary session number each other in their respective procedure steps 3106 and 3113 to mutually authenticate each other that the opponent is the one to which the initiation message was exchanged via IR communication. This allows the communication security to be further improved.

In the above description, although a case has been described in which both the IR and Bluetooth are used, it can be conceivable that the information specifying the communication means to be used for the exchange of five messages may be included in the initiation message. For example, if the IR communication is specified, the mobile user terminal 101 and the service terminal 105 will use the IR, not Bluetooth to exchange five messages to complete the transaction processing.

[Second Exemplary Procedure Pattern]

Now referring to FIG. 37(a) and (b), which shows the transaction processing procedure in the mobile user terminal 101 and the service terminal 105 in case of second pattern.

In this procedure, the mobile user terminal 101 will continue to transmit through IR communication, the initiation message, a message indicating the communication procedure with the mobile user terminal 101 (procedure step 3201) when a user will operate his/her mobile user terminal to start the transaction, until it will receive the authentication request in Bluetooth from the service terminal (procedure step 3202). In this case the initiation message may include the Bluetooth device address of the mobile user terminal 101, and the session number identifying the Bluetooth communication session that is arbitrary configured by the mobile user terminal.

The service terminal 105, on the other hand, will receive the initiation message from the mobile user terminal 101 via the IR communication port (IR module) 211 when the user operates the start operation of transaction (procedure step 3208). Then, the service terminal will locate the mobile user terminal 101 from the Bluetooth device list, based on the Bluetooth device address of the mobile user terminal included in the initiation message (procedure step 3209) and request for the authentication in Bluetooth to the mobile user terminal 101 (procedure step 3210).

Then, the mobile user terminal 101 and the service terminal 105 will mutually authenticate each other in respective procedure steps 3203 and 3211 on the basis of the Bluetooth authentication procedure, and will establish a Bluetooth session in their respective procedure steps 3204 and 3212.

Next, the mobile user terminal 101 and the service terminal 105 will check the session number in their respective procedure steps 3205 and 3213. More specifically, the service terminal 105 will send via Bluetooth to the mobile user terminal 101 the session number included in the initiation message. The mobile user terminal 101, on the other hand, will check a match between the received session number with the session number that the terminal has transmitted as part of the initiation message to distinguish the Bluetooth session.

Then, the mobile user terminal 101 and the service terminal 105 will exchange, in their respective procedure steps 3206 and 3214, a series of five messages, i.e., a Bluetooth presentation 1003, instruction 1004, transaction 1005, receipt 1006 and acknowledge 1007. In procedure steps 3207 and 3215, the Bluetooth session will be terminated to complete the transaction.

The mobile user terminal 101 may display an error message on the display 200 explaining the error details and abort the transaction when an error has been occurred during the Bluetooth authentication in the procedure step 3203; when an error has been occurred during the Bluetooth session number check in the procedure step 3205; or when an error has been occurred during exchange of five messages in the procedure step 3206.

The service terminal 105 will abort the processing, when a corresponding mobile user terminal 101 is not found in the Bluetooth device list in the procedure step 3209; when an error has been occurred during the Bluetooth authentication in the procedure step 3211; when an error has been occurred during the session number check in the procedure step 3213; or when an error has been occurred during exchange of five messages in the procedure step 3214.

In the above description, although the service terminal 105 may receive the initiation message from the mobile user terminal 101 through the IR communication in procedure step 3201, the initiation messages may alternatively be exchanged mutually therebetween by sending an initiation message from the service terminal 105 to the mobile user terminal 101 via IR. In this case, the initiation message transmitted from the service terminal 105 to the mobile user terminal 101 may include the Bluetooth device address of the service terminal 105 and the session number identifying the Bluetooth session that is arbitrary configured by the service terminal 105. The mobile user terminal 101 and the service terminal 105 may check their arbitrary session number each other in their respective procedure steps 3205 and 3213 to mutually authenticate each other that the opponent is the one to which the initiation message was exchanged via IR communication. This allows the communication security to be further improved.

In the above description, although a case has been described in which both the IR and Bluetooth are used, it can be conceivable that the information specifying the communication means to be used for the exchange of five messages may be included in the initiation message. For example, if the IR communication is specified, the mobile user terminal 101 and the service terminal 105 will use the IR, without Bluetooth, to exchange five messages to complete the transaction processing.

EFFECT OF THE INVENTION

As can be appreciated from the foregoing description, in accordance with the invention, an electronic wallet may provide means for storing and managing electronic information including an inherent private key and its certificate, as well as information signed with the private key. The validity of the electronic information may thereby be proved by itself to ensure the anonymity.

Also in accordance with the invention, the information signed with the private key as similar to the electronic information stored in the electronic wallet is variable property information. In addition, the fixed property information and presentation control information, both singed by the issuer of the electronic information may be provided so as to generate the presentation data from all three information items. The validity of the electronic information may be thereby proved by itself to ensure the anonymity.

Further in accordance with the invention, the information signed with the private key as similar to the electronic information stored in the electronic wallet is variable property information. In addition, the fixed property information signed by the issuer of the electronic information may be provided so as to include the information for obtaining the presentation control information. The information defined by the issuer of the electronic information may be incorporated in the electronic information.

Also in accordance with the invention, information signed with the private key as similar to the electronic information stored in the electronic wallet is variable property information. In addition, the fixed property information signed by the issuer of the electronic information may be provided so as to include the information for obtaining the presentation resource signed or not signed by the issuer of the electronic information to generate the presentation data from all three information items. The validity of the electronic information may be thereby proved by itself to ensure the anonymity. In addition the information defined by the issuer of the electronic information may be incorporated in the electronic information.

Furthermore in accordance with the invention, information signed with the private key as similar to the electronic information stored in the electronic wallet is variable property information. Moreover, the fixed property information signed by the issuer of the electronic information may be provided so as to include the information for obtaining the presentation resource signed or not signed by the issuer of the electronic information. The validity of the electronic information may be thereby proved by itself to ensure the anonymity. In addition the information defined by the issuer of the electronic information may be incorporated in the electronic information.

Also in accordance with the invention, information signed with the private key as similar to the electronic information stored in the electronic wallet is variable property information. Moreover, the fixed property information signed by the issuer of the electronic information may be provided so as to include the authentication key of the electronic information handler, to have said electronic information handler perform the transaction processing with another terminal having the electronic information in order to authenticate the electronic information handler by the authentication key of the electronic information handler, allowing the security to be improved.

Yet in accordance with the invention, information signed with the private key as similar to the electronic information stored in the electronic wallet is variable property information. Moreover, the fixed property information signed by the issuer of the electronic information may be provided so as to include the information for obtaining the presentation control information, the information for obtaining the presentation resource, and the authentication key of the electronic information handler. The electronic information handler may be authenticated by the authentication key of the electronic information handler, allowing the security to be improved.

Still further in accordance with the invention, information signed with the private key as similar to the electronic information stored in the electronic wallet is variable property information. Moreover, the fixed property information signed by the issuer of the electronic information may be provided so as to include the service control information, which may also define the transaction processing performed with the electronic information. By updating the service control information, various electronic information may be defined.

Furthermore in accordance with the invention, information signed with the private key as similar to the electronic information stored in the electronic wallet is variable property information. Moreover, the fixed property information signed by the issuer of the electronic information may be provided so as to additionally include the information for obtaining the presentation control information, the information for obtaining the presentation resource, the authentication key of the electronic information handler, and the service control information.

Therefore updating the service control information may define various electronic information.

Also in accordance with the invention, means for generating electronic information object from electronic information and controlling said electronic information may be provided, so as for said electronic information object to embed the transaction data based on said service control information into each message to be exchanged when performing the transaction processing. This allows the security to be improved without increasing the amount of data since the electronic information object updates and signs to the electronic information.

In addition, in accordance with the invention, the service control information may be composed of a combination of service control module information. Changing the combination of service control module information may also define various electronic information.

Still further in accordance with the invention, when the electronic information object performs the settlement, the transaction settlement message on the basis of the service control information that will be embedded into each messages to be exchanged at the time of settlement may be a message from the electronic information requesting the transaction settlement to the electronic information handler, allowing the transaction in various electronic information to be processed more economically and efficiently.

Yet in accordance with the invention, when the electronic information object performs the settlement, the settlement message on the basis of the service control information embedded into each message to be exchanged at the time of the settlement may be the message from the electronic information handler to the electronic information for instructing the update of property values. This allows the settlement in various electronic information to be performed at higher efficiency.

Also further in accordance with the present invention, when the electronic information object performs the settlement, the settlement message on the basis of the service control information embedded into each message to be exchanged at the time of the settlement may be the message from the electronic information to the electronic information handler for indicating the result of update of the property values. This allows the transaction settlement in various electronic information to be performed at higher efficiency.

Also in accordance with the invention, when the electronic information object performs the settlement, the settlement message on the basis of the service control information embedded into each message to be exchanged at the time of the settlement may be a message that may correspond to a receipt from the electronic information handler to the electronic information. This allows the settlement in various electronic information to be performed at higher efficiency.

What is claimed is:

1. A communication terminal, including:
a processor;
a first wireless communication hardware controlled by the processor, and configured to perform direct communication with a device using a first wireless communication scheme; and
a second wireless communication hardware controlled by the processor, and configured to perform direct communication with the device using a second wireless communication scheme which is different from the first wireless communication scheme, wherein:
the first wireless communication hardware is configured to: 1) receive first information from the device, which is unspecified, using the first wireless communication scheme, the first information being information for starting direct communication with the device using the second wireless communication scheme via the second wireless communication hardware, and 2) send second information to the device using the first wireless communication scheme, the second information being information for starting direct communication with the communication terminal using the second wireless communication scheme via the second wireless communication hardware;
said second wireless communication hardware includes a device list, listing devices in a state capable of direct communication using the second wireless communication scheme; and
the second wireless communication hardware is configured to connect directly to the device in response to the processor identifying the device in the list based on said first information, and establish a communication session with the device using the second wireless communication scheme.

2. The communication terminal according to claim 1, wherein the first information includes a device address of the other party's device and a session number specified by the other party's device, and the second information includes a device address of the communication terminal and a session number specified by the communication terminal.

3. The communication terminal according to claim 2, wherein the second wireless communication hardware is configured to identify the other party's device from the device list using the device address of the other party's device, and is configured to perform authentication processing by receiving information from the identified other party's device and by comparing one session number included in the first information received from the identified other party's device and the other session number included in the second information.

4. The communication terminal according to claim 1, wherein the first wireless communication hardware has directivity.

5. The communication terminal according to claim 3, wherein the first wireless communication hardware has directivity.

6. A communication terminal including:
a processor;
a first wireless communication hardware controlled by the processor, and configured to perform direct communication with a device using a first wireless communication scheme; and
a second wireless communication hardware controlled by the processor, and configured to perform direct communication with the device using a second wireless communication scheme which is different from the first wireless communication scheme, wherein:
the first wireless communication hardware is configured to: 1) send first information to the device, which is unspecified, using the first wireless communication scheme, the first information being information for starting direct communication with the communication terminal using the second wireless communication scheme via the second wireless communication hardware, and 2) receive second information from the device using the first wireless communication scheme, the second information being information for starting direct communication with the device using the second wireless communication scheme via the second wireless communication hardware;
said second wireless communication hardware includes a device list, listing devices in a state capable of direct communication using the second wireless communication scheme; and
the second wireless communication hardware, is configured to connect directly to the device in response to the processor identifying the device in the list based on said second information and establish a communication session with the device using the second wireless communication scheme.

7. The communication terminal according to claim 6, wherein the first information includes a device address of the communication terminal and a session number specified by the communication terminal, and the second information includes a device address of the device and a session number specified by the device.

8. The communication terminal according to claim 7, wherein the second wireless communication is configured to perform authentication processing by receiving information from the device and by comparing one session number included in the first information received from the device and the other session number included in the second information.

9. The communication terminal according to claim 6, wherein the first wireless communication hardware has directivity.

10. The communication terminal according to claim 8, wherein the first wireless communication hardware has directivity.

11. A communication method comprising:
sending, by a processor of a service terminal, first information to a user terminal using a first wireless communication scheme via a first service terminal wireless communication hardware, the first information being information for starting direct communication with the service terminal using a second wireless communication scheme different from the first wireless communication scheme via a second service terminal wireless communication hardware;
receiving, by a processor of the user terminal, the first information from the service terminal using the first wireless communication scheme via a first user terminal wireless communication hardware;
sending, by the processor of the user terminal, second information to the service terminal using the first wireless communication scheme via the first user terminal wireless communication hardware, the second information being information for starting direct communication with the user terminal using the second wireless communication scheme via a second user terminal wireless communication hardware; and
receiving, by the processor of the service terminal, the second information from the user terminal using the first wireless communication scheme via a first service terminal wireless communication hardware, and
when the wireless communication scheme specified by said information for specifying wireless communication scheme is the second wireless communication scheme:
identifying, by the processor of the user terminal, the service terminal to establish a connection from a device list, listing devices in a state capable of direct communication using the second wireless communication scheme, based on the first information, and
establishing, by the processor of the user terminal, a communication session with the service terminal using the second wireless communication scheme via the second user terminal wireless communication hardware.

12. The communication method according to claim 11, wherein the first information includes a device address of the service terminal and a session number specified by the service terminal, and the second information includes a device address of the user terminal and a session number specified by the user terminal.

13. A communication method comprising:
sending, by a processor of a user terminal, first information to a service terminal using a first wireless communication scheme via a first user terminal wireless communication hardware, the first information being information for starting direct communication with the user terminal using a second wireless communication scheme different from the first wireless communication scheme via a second user terminal wireless communication hardware;
receiving, by a processor of the service terminal, the first information from the user terminal using the first wireless communication scheme via a first service terminal wireless communication hardware;
sending, by the processor of the service terminal, second information to the user terminal using the first wireless communication scheme via the first service terminal wireless communication hardware, the second information being information for starting direct communication with the service terminal using the second wireless communication scheme via a second service terminal wireless communication hardware; and
receiving, by the processor of the user terminal, the second information from the service terminal using the first wireless communication scheme via the first user terminal wireless communication hardware,
when the wireless communication scheme specified by said information for specifying wireless communication scheme is the second wireless communication scheme:
searching, by the processor of the service terminal, the user terminal to establish a connection from a device list, listing devices in a state capable of direct communication using the second wireless communication scheme, based on the first information, and
establishing, by the processor of the service terminal, a communication session with the user terminal using the second wireless communication scheme via the second service terminal wireless communication hardware.

14. The communication method according to claim 13, wherein the second information includes a device address of the service terminal and a session number specified by the service terminal, and the first information includes a device address of the user terminal and a session number specified by the user terminal.

* * * * *